(12) United States Patent
Furutani et al.

(10) Patent No.: US 12,473,386 B2
(45) Date of Patent: Nov. 18, 2025

(54) FLUORINE-CONTAINING ELASTOMER, CROSSLINKABLE COMPOSITION AND MOLDED ARTICLE

(71) Applicant: DAIKIN INDUSTRIES, LTD., Osaka (JP)

(72) Inventors: Takahiro Furutani, Osaka (JP); Akihiro Gotou, Osaka (JP); Masaki Irie, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 656 days.

(21) Appl. No.: 17/285,540

(22) PCT Filed: Oct. 18, 2019

(86) PCT No.: PCT/JP2019/041095
§ 371 (c)(1),
(2) Date: Apr. 15, 2021

(87) PCT Pub. No.: WO2020/080523
PCT Pub. Date: Apr. 23, 2020

(65) Prior Publication Data
US 2021/0380739 A1    Dec. 9, 2021

(30) Foreign Application Priority Data

Oct. 18, 2018   (JP) .................. 2018-196485

(51) Int. Cl.
C08F 214/22    (2006.01)
C08K 5/00     (2006.01)

(52) U.S. Cl.
CPC ........ C08F 214/222 (2013.01); C08K 5/0025 (2013.01)

(58) Field of Classification Search
CPC ............... C08F 214/22; C08F 214/222; C08F 216/1408
See application file for complete search history.

(56) References Cited

U.S. PATENT DOCUMENTS

| | | | |
|---|---|---|---|
| 5,804,650 A | 9/1998 | Tsuda et al. | |
| 2008/0227948 A1 | 9/2008 | Tsuda et al. | |
| 2011/0269911 A1 | 11/2011 | Morita et al. | |
| 2012/0077939 A1 | 3/2012 | Ota et al. | |
| 2013/0261249 A1* | 10/2013 | Apostolo | C08F 2/38 524/546 |
| 2013/0274420 A1 | 10/2013 | Morita et al. | |
| 2016/0215133 A1* | 7/2016 | Bonnet | C08J 3/005 |

FOREIGN PATENT DOCUMENTS

| | | | | |
|---|---|---|---|---|
| CN | 103370346 A | | 10/2013 | |
| CN | 103840178 A | | 6/2014 | |
| JP | 8-67795 A | | 3/1996 | |
| JP | 2005-320499 A | | 11/2005 | |
| JP | 2006002132 A | * | 1/2006 | ............ G02B 6/138 |
| JP | 2010234770 A | * | 10/2010 | |
| JP | 2012-512264 A | | 5/2012 | |
| WO | 2012/026559 A1 | | 3/2012 | |

OTHER PUBLICATIONS

Machine translation into English of JP-2006002132-A; Tanaka et al (Year: 2006).*
Machine translation into English of JP-2010234770-A; (Nakagawa et al (Year: 2010).*
Gelin et al; Journal of Fluorine Chemistry 126, pp. 577-585; (Year: 2005).*
Human translation (partial) of JP 2010-234770 A; Nakagawa et al; (Year: 2010).*
Bruno Ameduri et al., "Synthesis and Polymerization of Fluorinated Monomers Bearing a Reactive Lateral Group. XIV.+ Radical Copolymerization of Vinylidene Fluoride with Methyl 1,1-Dihydro-4,7-dioxa perfluoro-5,8-dimethyl Non-1-enoate", Journal of Polymer Science: Part A: Polymer Chemistry, 2003, vol. 41, pp. 3109-3121 (13 pages).
Extended European Search Report dated Jun. 15, 2022 in corresponding European Application No. 19874015.1.
International Search Report for PCT/JP2019/041095 dated Dec. 17, 2019 (PCT/ISA/210).
International Preliminary Report on Patentability with the translation of Written Opinion dated Apr. 14, 2021 from the International Bureau in International Application No. PCT/JP2019/041095.

* cited by examiner

*Primary Examiner* — Karuna P Reddy
(74) *Attorney, Agent, or Firm* — Sughrue Mion, PLLC

(57) ABSTRACT

A fluorine-containing elastomer including a vinylidene fluoride unit and an unsaturated ether unit selected from a unit based on a monomer (1) represented by the general formula (1): $CH_2=CFCF_2-O-Rf^1$ and a unit based on a monomer (2) represented by the general formula (2): $CH_2=CF-O-Rf^2$, and having a glass transition temperature of 20° C. or lower, a crosslinkable composition including the fluorine-containing elastomer, and a molded article obtained from the fluorine-containing elastomer or the crosslinkable composition.

6 Claims, 1 Drawing Sheet

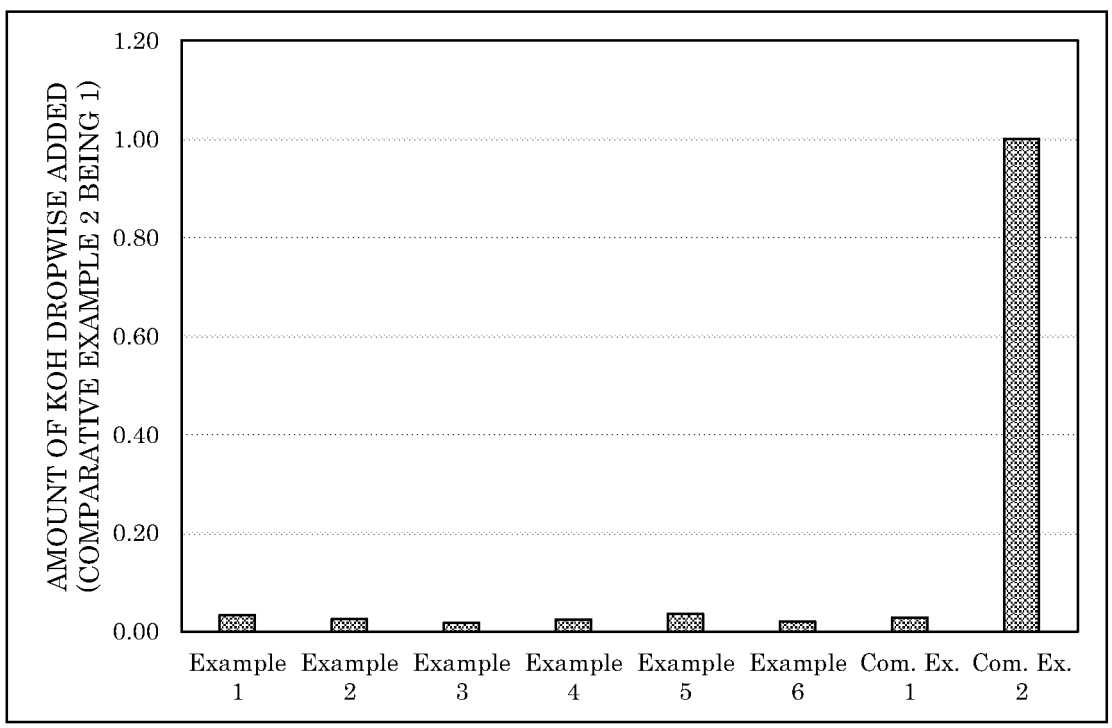

FLUORINE-CONTAINING ELASTOMER, CROSSLINKABLE COMPOSITION AND MOLDED ARTICLE

CROSS REFERENCE TO RELATED APPLICATIONS

This application is a National Stage of International Application No. PCT/JP2019/041095 filed Oct. 18, 2019, claiming priority based on Japanese Patent Application No. 2018-196485 filed Oct. 18, 2018.

TECHNICAL FIELD

The present disclosure relates to a fluorine-containing elastomer, a crosslinkable composition and a molded article.

BACKGROUND ART

In Patent Document 1, an amorphous fluorine-containing elastomer which is a copolymer composed of only vinylidene fluoride [VdF] and a fluorine-containing monomer represented by the following general formula (1)

$$CH_2=CFRf \qquad (1)$$

wherein Rf is a linear or branched fluoroalkyl group having 1 to 12 carbon atoms, and is characterized in that a molar ratio of a vinylidene fluoride unit/a fluorine-containing monomer unit is 78/22 to 22/78, and the glass transition temperature is 25° C. or lower, has been proposed as an amorphous fluorine-containing elastomer having a low glass transition temperature and excellent amine resistance.

RELATED ART

Patent Documents

Patent Document 1: Japanese Translation of PCT International Application Publication No. 2012-512264

SUMMARY OF THE INVENTION

Problem to be Solved by the Invention

It is an object of the present disclosure to provide a fluorine-containing elastomer excellent in low-temperature resistance and resistance to bases, a crosslinkable composition containing the fluorine-containing elastomer, and a molded article obtained from the fluorine-containing elastomer or the crosslinkable composition.

Means for Solving the Problem

According to the present disclosure, provided is a fluorine-containing elastomer comprising a vinylidene fluoride unit and at least one unsaturated ether unit selected from the group consisting of a unit based on a monomer (1) represented by the general formula (1) and a unit based on a monomer (2) represented by the general formula (2), and having a glass transition temperature of 20° C. or lower, $$CH_2=CFCF_2-O-Rf^1 \qquad \text{the general formula (1):}$$

wherein $Rf^1$ is a linear or branched chain fluorinated alkyl group having 1 to 20 carbon atoms, and optionally containing an oxygen atom between carbon-carbon atoms when the fluorinated alkyl group has 2 or more carbon atoms, $$CH_2=CF-O-Rf^2 \qquad \text{the general formula (2):}$$

wherein $Rf^2$ is a fluorinated alkyl group.

The fluorine-containing elastomer of the present disclosure preferably comprises the unit based on the monomer (1).

In the general formula (1), $Rf^1$ is preferably a linear or branched chain fluorinated alkyl group having 1 to 14 carbon atoms, or a linear or branched chain fluorinated alkyl group having 2 to 20 carbon atoms and containing an oxygen atom between carbon-carbon atoms.

In the general formula (1), $Rf^1$ is preferably a group represented by the general formula (3): $-(Rf^3-O)_n-Rf^4$ wherein $Rf^3$ is a linear or branched chain fluorinated alkylene group having 1 to 4 carbon atoms, $Rf^4$ is a linear or branched chain fluorinated alkyl group having 1 to 4 carbon atoms, and n is an integer of 0 to 4.

n in the general formula (3) is preferably an integer of 1 to 4.

In the fluorine-containing elastomer of the present disclosure, a molar ratio of the vinylidene fluoride unit to the unsaturated ether unit (vinylidene fluoride unit/unsaturated ether unit) is preferably 95/5 to 20/80.

According to the present disclosure, a crosslinkable composition comprising the above-mentioned fluorine-containing elastomer and a cross-linking agent is provided.

According to the present disclosure, a molded article obtained from the above-mentioned fluorine-containing elastomer or the above-mentioned crosslinkable composition is provided.

Effects of Invention

According to the present disclosure, a fluorine-containing elastomer excellent in low-temperature resistance and resistance to bases, a crosslinkable composition containing the fluorine-containing elastomer, and a molded article obtained from the fluorine-containing elastomer or the crosslinkable composition can be provided.

BRIEF DESCRIPTION OF DRAWINGS

The FIGURE shows a graph illustrating results of evaluation of resistance to bases in examples and comparative examples.

DESCRIPTION OF EMBODIMENTS

Specific embodiments of the present disclosure will be described in detail, but the present disclosure is not limited to the following embodiments.

The fluorine-containing elastomer of the present disclosure contains a vinylidene fluoride unit and at least one unsaturated ether unit selected from the group consisting of a monomer (1) unit and a monomer (2) unit, and has a glass transition temperature of 20° C. or lower. Since the fluorine-containing elastomer of the present disclosure has such constitution, it exhibits excellent low-temperature resistance and resistance to bases. Moreover, by using the fluorine-containing elastomer of the present disclosure, a crosslinked rubber molded article exhibiting a sufficiently low compression set even in a high-temperature environment can be obtained.

The glass transition temperature of the fluorine-containing elastomer is 20° C. or lower, and because of much more excellent low-temperature resistance, it is preferably 0° C. or lower, more preferably −10° C. or lower, still more preferably −15° C. or lower, particularly preferably −20° C. or lower, and most preferably −25° C. or lower. Although the lower limit is preferably lower, it may be, for example, −50° C.

The fluorine-containing elastomer is preferably amorphous. In the present disclosure, the "amorphous" means that the magnitude of a melting peak (ΔH) appearing in the DSC measurement (temperature-increasing rate: 20° C./min) is 2.0 J/g or less.

The glass transition temperature is determined by cooling 10 mg of a sample down to −75° C. and then heating it at 20° C./min by the use of a differential scanning calorimeter (manufactured by Mettler Toledo, DSC822e) to obtain a DSC curve, and obtaining, as the glass transition temperature, a temperature indicating an intersection point of an extension of a baseline around the second-order transition of the DSC curve with a tangent of the DSC curve at the inflection point.

In the fluorine-containing elastomer, the content of the vinylidene fluoride units based on all monomer units is preferably 20 mol % or more, more preferably 50 mol % or more, still more preferably 60 mol % or more, and particularly preferably 70 mol % or more, and is preferably 95 mol % or less, more preferably 93 mol % or less, and still more preferably 90 mol % or less, from the viewpoints of low-temperature resistance and resistance to bases. As the content of the vinylidene fluoride units is larger in the above-mentioned numerical value range of the content of the vinylidene fluoride units, the fluorine-containing elastomer tends to be able to be produced at lower cost. Moreover, the fluorine-containing elastomer containing a larger amount of the vinylidene fluoride units tends to be more excellent in low-temperature properties, and tends to be more excellent in processability and moldability because it has appropriate viscosity.

The fluorine-containing elastomer of the present disclosure contains, in addition to the vinylidene fluoride unit, at least one unsaturated ether unit selected from the group consisting of a monomer (1) unit and a monomer (2) unit. Since the fluorine-containing elastomer of the present disclosure contains the unsaturated ether unit, it is excellent in low-temperature resistance and resistance to bases. The unsaturated ether unit in the present disclosure is a unit based on at least one unsaturated ether selected from the group consisting of a monomer (1) and a monomer (2).

The monomer (1) unit is a unit based on a monomer (1) represented by the general formula (1):

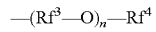

$CH_2=CFCF_2-O-Rf^1$ wherein $Rf^1$ is a linear or branched chain fluorinated alkyl group having 1 to 20 carbon atoms, and optionally containing an oxygen atom between carbon-carbon atoms when the fluorinated alkyl group has 2 or more carbon atoms.

The fluorinated alkyl group as $Rf^1$ may be a partially fluorinated alkyl group wherein part of hydrogen atoms bonded to carbon atoms have been substituted by fluorine atoms, or may be a perfluorinated alkyl group wherein all hydrogen atoms bonded to carbon atoms have been substituted by fluorine atoms. In the fluorinated alkyl group as $Rf^1$, a hydrogen atom may have been substituted by a substituent other than a fluorine atom, but it is preferable that the fluorinated alkyl group should not contain a substituent other than a fluorine atom.

Since much more excellent low-temperature resistance and resistance to bases are obtained, $Rf^1$ is preferably a linear or branched chain fluorinated alkyl group having 1 to 14 carbon atoms and containing no oxygen atom between carbon-carbon atoms, or a linear or branched chain fluorinated alkyl group having 2 to 20 carbon atoms and containing an oxygen atom between carbon-carbon atoms.

Since much more excellent low-temperature resistance and resistance to bases are obtained, $Rf^1$ is preferably a monovalent group represented by the general formula (3):

$-(Rf^3-O)_n-Rf^4$ wherein $Rf^3$ is a linear or branched chain fluorinated alkylene group having 1 to 4 carbon atoms, $Rf^4$ is a linear or branched chain fluorinated alkyl group having 1 to 4 carbon atoms, and n is an integer of 0 to 4.

Examples of the fluorinated alkylene groups as $Rf^3$ include —CHF—, —CF$_2$—, —CH$_2$—CF$_2$—, —CHF—CF$_2$—, —CF$_2$—CF$_2$—, —CF(CF$_3$)—, —CH$_2$—CF$_2$—CF$_2$—, —CHF—CF$_2$—CF$_2$—, —CF$_2$—CF$_2$—CF$_2$—, —CF(CF$_3$)—CF$_2$—, —CF$_2$—CF(CF$_3$)—, —C(CF$_3$)$_2$—, —CH$_2$—CF$_2$—CF$_2$—CF$_2$—, —CHF—CF$_2$—CF$_2$—CF$_2$—, —CF$_2$—CF$_2$—CF$_2$—CF$_2$—, —CH(CF$_3$)—CF$_2$—CF$_2$—, —CF(CF$_3$)—CF$_2$—CF$_2$— and —C(CF$_3$)$_2$—CF$_2$—, and above all, perfluorinated alkylene groups having 1 to 3 carbon atoms are preferable, and —CF$_2$—, —CF$_2$CF$_2$—, —CF$_2$—CF$_2$—CF$_2$—, —CF(CF$_3$)—CF$_2$— or —CF$_2$—CF(CF$_3$)— is more preferable.

The fluorinated alkyl group as $Rf^4$ may be a partially fluorinated alkyl group wherein part of hydrogen atoms bonded to carbon atoms have been substituted by fluorine atoms, or may be a perfluorinated alkyl group wherein all hydrogen atoms bonded to carbon atoms have been substituted by fluorine atoms. In the fluorinated alkyl group as $Rf^4$, a hydrogen atom may have been substituted by a substituent other than a fluorine atom, but it is preferable that the fluorinated alkyl group should not contain a substituent other than a fluorine atom (e.g., —OH, —COOH, —CN, —CH$_2$I, —CH$_2$Br).

Examples of the fluorinated alkyl groups as $Rf^4$ include —CH$_2$F, —CHF$_2$, —CF$_3$, —CH$_2$—CH$_2$F, —CH$_2$—CHF$_2$, —CH$_2$—CF$_3$, —CHF—CH$_2$F, —CHF—CHF$_2$, —CHF—CF$_3$, —CF$_2$—CH$_2$F, —CF$_2$—CHF$_2$, —CF$_2$—CF$_3$, —CH$_2$—CF$_2$—CH$_2$F, —CHF—CF$_2$—CH$_2$F, —CF$_2$—CF$_2$—CH$_2$F, —CF(CF$_3$)—CH$_2$F, —CH$_2$—CF$_2$—CHF$_2$, —CHF—CF$_2$—CHF$_2$, —CF$_2$—CF$_2$—CHF$_2$, —CF(CF$_3$)—CHF$_2$, —CH$_2$—CF$_2$—CF$_3$, —CHF—CF$_2$—CF$_3$, —CF$_2$—CF$_2$—CF$_3$, —CF(CF$_3$)—CF$_3$, —CH$_2$—CF$_2$—CF$_2$—CF$_3$, —CHF—CF$_2$—CF$_2$—CF$_3$, —CF$_2$—CF$_2$—CF$_2$—CF$_3$, —CH(CF$_3$)—CF$_2$—CF$_3$, —CF(CF$_3$)—CF$_2$—CF$_3$ and —C(CF$_3$)$_2$—CF$_3$, and above all, fluorinated alkyl groups having 1 to 4 carbon atoms are preferable, and —CF$_3$, —CHF—CF$_3$, —CF$_2$—CHF$_2$, —CF$_2$—CF$_3$, —CF(CF$_3$)—CF$_3$, —CH(CF$_3$)—CF$_2$—CF$_3$ or —CF(CF$_3$)—CF$_2$—CF$_3$ is more preferable.

n in the general formula (3) is preferably an integer of 1 to 4, more preferably 1 or 2, and still more preferably 1, because much more excellent low-temperature resistance and resistance to bases are obtained. When low-temperature resistance is particularly regarded as important, the value of n is preferably larger, and is more preferably 3 or 4.

The monomer (2) unit is a unit based on a monomer (2) represented by the general formula (2):

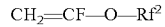

$CH_2=CF-O-Rf^2$ wherein $Rf^2$ is a fluorinated alkyl group.

The fluorinated alkyl group as $Rf^2$ may be a partially fluorinated alkyl group wherein part of hydrogen atoms bonded to carbon atoms have been substituted by fluorine atoms, or may be a perfluorinated alkyl group wherein all hydrogen atoms bonded to carbon atoms have been substituted by fluorine atoms. In the fluorinated alkyl group as $Rf^2$, a hydrogen atom may have been substituted by a substituent other than a fluorine atom, but it is preferable that the fluorinated alkyl group should not contain a substituent other than a fluorine atom.

$Rf^2$ is preferably a linear or branched chain fluorinated alkyl group having 1 to 20 carbon atoms. The fluorinated alkyl group optionally contains an oxygen atom between carbon-carbon atoms when the fluorinated alkyl group has 2 or more carbon atoms. $Rf^2$ more preferably has 1 to 14 carbon atoms, still more preferably 1 to 5 carbon atoms.

Since much more excellent low-temperature resistance and resistance to bases are obtained, $Rf^2$ is preferably a linear or branched chain fluorinated alkyl group having 1 to 14 carbon atoms and containing no oxygen atom between carbon-carbon atoms, or a linear or branched chain fluorinated alkyl group having 2 to 20 carbon atoms and containing an oxygen atom between carbon-carbon atoms.

Since much more excellent low-temperature resistance and resistance to bases are obtained, examples of the fluorinated alkyl groups as $Rf^2$ include —CH$_2$F, —CHF$_2$, —CF$_3$, —CH$_2$—CH$_2$F, —CH$_2$—CHF$_2$, —CH$_2$—CF$_3$, —CHF—CH$_2$F, —CHF—CHF$_2$, —CHF—CF$_3$, —CF$_2$—CH$_2$F, —CF$_2$—CHF$_2$, —CF$_2$—CF$_3$, —CH$_2$—CF$_2$—CH$_2$F, —CHF—CF$_2$—CH$_2$F, —CF$_2$—CF$_2$—CH$_2$F, —CF(CF$_3$)—CH$_2$F, —CH$_2$—CF$_2$—CHF$_2$, —CHF—CF$_2$—CHF$_2$, —CF$_2$—CF$_2$—CHF$_2$, —CF(CF$_3$)—CHF$_2$, —CH$_2$—CF$_2$—CF$_3$, —CHF—CF$_2$—CF$_3$, —CF$_2$—CF$_2$—CF$_3$, —CF(CF$_3$)—CF$_3$, —CH$_2$—CF$_2$—CF$_2$—CF$_3$, —CHF—CF$_2$—CF$_2$—CF$_3$, —CF$_2$—CF$_2$—CF$_2$—CF$_3$, —CH(CF$_3$)—CF$_2$—CF$_3$, —CF(CF$_3$)—CF$_2$—CF$_3$ and —C(CF$_3$)$_2$—CF$_3$, and above all, perfluorinated alkyl groups having 1 to 4 carbon atoms are preferable, and —CF$_3$, —CF$_2$—CF$_3$, —CF$_2$—CF$_2$—CF$_3$ or —CF(CF$_3$)—CF$_3$ is more preferable.

Since much more excellent low-temperature resistance and resistance to bases are obtained, $Rf^2$ is preferably a monovalent group represented by the general formula (4):

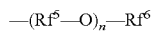

wherein $Rf^5$ is a linear or branched chain fluorinated alkylene group having 1 to 4 carbon atoms, $Rf^6$ is a linear or branched chain fluorinated alkyl group having 1 to 4 carbon atoms, and n is an integer of 0 to 4.

Examples of the fluorinated alkylene groups as $Rf^5$ include —CHF—, —CF$_2$—, —CH$_2$—CF$_2$—, —CHF—CF$_2$—, —CF$_2$—CF$_2$—, —CF(CF$_3$)—, —CH$_2$—CF$_2$—CF$_2$—, —CHF—CF$_2$—CF$_2$—, —CF$_2$—CF$_2$—CF$_2$—, —CF(CF$_3$)—CF$_2$—, —CF$_2$—CF(CF$_3$)—C(CF$_3$)$_2$—, —CH$_2$—CF$_2$—CF$_2$—CF$_2$—, —CHF—CF$_2$—CF$_2$—CF$_2$—, —CF$_2$—CF$_2$—CF$_2$—CF$_2$—, —CH(CF$_3$)—CF$_2$—CF$_2$—, —CF(CF$_3$)—CF$_2$—CF$_2$— and —C(CF$_3$)$_2$—CF$_2$—, and above all, perfluorinated alkylene groups having 1 to 3 carbon atoms are preferable, and —CF$_2$—, —CF$_2$CF$_2$—, —CF$_2$—CF$_2$—CF$_2$—, —CF(CF$_3$)—CF$_2$— or —CF$_2$—CF(CF$_3$)— is more preferable.

The fluorinated alkyl group as $Rf^6$ may be a partially fluorinated alkyl group wherein part of hydrogen atoms bonded to carbon atoms have been substituted by fluorine atoms, or may be a perfluorinated alkyl group wherein all hydrogen atoms bonded to carbon atoms have been substituted by fluorine atoms. In the fluorinated alkyl group as $Rf^6$, a hydrogen atom may have been substituted by a substituent other than a fluorine atom, but it is preferable that the fluorinated alkyl group should not contain a substituent other than a fluorine atom (e.g., —OH, —COOH, —CN, —CH$_2$I, —CH$_2$Br).

Examples of the fluorinated alkyl groups as $Rf^6$ include —CH$_2$F, —CHF$_2$, —CF$_3$, —CH$_2$—CH$_2$F, —CH$_2$—CHF$_2$, —CH$_2$—CF$_3$, —CHF—CH$_2$F, —CHF—CHF$_2$, —CHF—CF$_3$, —CF$_2$—CH$_2$F, —CF$_2$—CHF$_2$, —CF$_2$—CF$_3$, —CH$_2$—CF$_2$—CH$_2$F, —CHF—CF$_2$—CH$_2$F, —CF$_2$—CF$_2$—CH$_2$F, —CF(CF$_3$)—CH$_2$F, —CH$_2$—CF$_2$—CHF$_2$, —CHF—CF$_2$—CHF$_2$, —CF$_2$—CF$_2$—CHF$_2$, —CF(CF$_3$)—CHF$_2$, —CH$_2$—CF$_2$—CF$_3$, —CHF—CF$_2$—CF$_3$, —CF$_2$—CF$_2$—CF$_3$, —CF(CF$_3$)—CF$_3$, —CH$_2$—CF$_2$—CF$_2$—CF$_3$, —CHF—CF$_2$—CF$_2$—CF$_3$, —CF$_2$—CF$_2$—CF$_2$—CF$_3$, —CH(CF$_3$)—CF$_2$—CF$_3$, —CF(CF$_3$)—CF$_2$—CF$_3$ and —C(CF$_3$)$_2$—CF$_3$, and above all, fluorinated alkyl groups having 1 to 4 carbon atoms are preferable, and —CF$_3$, —CHF—CF$_3$, —CF$_2$—CHF$_2$, —CF$_2$—CF$_3$, —CF(CF$_3$)—CF$_3$, —CH(CF$_3$)—CF$_2$—CF$_3$ or —CF(CF$_3$)—CF$_2$—CF$_3$ is more preferable.

n in the general formula (4) is preferably an integer of 1 to 4, more preferably 1 or 2, and still more preferably 1, because much more excellent low-temperature resistance and resistance to bases are obtained. When low-temperature resistance is particularly regarded as important, the value of n is preferably larger, and is more preferably 3 or 4.

Since much more excellent low-temperature resistance and resistance to bases are obtained, examples of the unsaturated ethers include CH$_2$=CFCF$_2$—O—CF(CF$_3$)—CF$_2$—O—CHF—CF$_3$,
CH$_2$=CFCF$_2$—O—CF(CF$_3$)—CF$_2$—O—CF$_2$—CF$_3$,
CH$_2$=CFCF$_2$—O—CF(CF$_3$)—CF$_2$—O—CF(CF$_3$)—CF$_3$,
CH$_2$=CFCF$_2$—O—CF(CF$_3$)—CF$_2$O—CH(CF$_3$)—CF$_2$—CF$_3$,
CH$_2$=CFCF$_2$—O—CF(CF$_3$)—CF$_2$—O—CF(CF$_3$)—CF$_2$—CF$_3$,
CH$_2$=CFOCF$_2$OCF$_3$,
CH$_2$=CFOCF$_2$CF$_2$CF$_2$OCF$_3$,
CH$_2$=CFCF$_2$OCF$_2$OCF$_3$,
CH$_2$=CFCF$_2$$_0$CF$_2$CF$_2$CF$_2$OCF$_3$, and
CH$_2$=CF—O—CF$_2$—CF$_3$.

Since much more excellent low-temperature resistance and resistance to bases are obtained, the unsaturated ether may be the monomer (1); and may be CH$_2$=CFCF$_2$—O—CF(CF$_3$)—CF$_2$—O—CHF—CF$_3$,
CH$_2$=CFCF$_2$—O—CF(CF$_3$)—CF$_2$—O—CF$_2$—CF$_3$,
CH$_2$=CFCF$_2$—O—CF(CF$_3$)—CF$_2$—O—CF(CF$_3$)—CF$_3$,
CH$_2$=CFCF$_2$—O—CF(CF$_3$)—CF$_2$—O—CH(CF$_3$)—CF$_2$—CF$_3$, or
CH$_2$=CFCF$_2$—O—CF(CF$_3$)—CF$_2$—O—CF(CF$_3$)—CF$_2$—CF$_3$; and may be
CH$_2$=CFCF$_2$—O—CF(CF$_3$)—CF$_2$—O—CHF—CF$_3$.

The fluorine-containing elastomer may further contain another monomer unit except the vinylidene fluoride unit and the unsaturated ether unit. The another monomer is not limited as long as it is a monomer copolymerizable with vinylidene fluoride and the unsaturated ether, and one or two or more monomers may be used.

The above-mentioned another monomer is preferably at least one selected from the group consisting of tetrafluoroethylene [TFE], hexafluoropropylene [HFP], perfluoro(methyl vinyl ether), perfluoro(ethyl vinyl ether), perfluoro(propyl vinyl ether), chlorotrifluoroethylene, trifluoroethylene, hexafluoroisobutene, vinyl fluoride, ethylene, propylene, alkyl vinyl ether, a fluorine-containing monomer (11) represented by the following general formula (11), and a monomer giving a crosslinking site; it is more preferably at least one selected from the group consisting of TFE, hexafluoropropylene, perfluoro(methyl vinyl ether), perfluoro(ethyl vinyl ether), perfluoro (propyl vinyl ether), chlorotrifluoroethylene, trifluoroethylene, hexafluoroisobutene, vinyl fluoride, ethylene, alkyl vinyl ether, a fluorine-containing monomer (11), and a monomer giving a crosslinking site; and it is still more preferably TFE. Use of TFE only as the above another monomer is also a preferred embodiment.

The fluorine-containing monomer (11) is represented by the general formula (11):

$$CHX^{11}=CX^{12}Rf$$

wherein one of $X^{11}$ and $X^{12}$ is H, the other is F, and Rf is a linear or branched fluoroalkyl group having 1 to 12 carbon atoms.

Rf in the general formula (11) is preferably a linear fluoroalkyl group, and more preferably a linear perfluoroalkyl group, because a molded article much more excellent in resistance to bases and low-temperature resistance can be obtained. The number of carbon atoms of Rf is preferably 1 to 6.

In the general formula (11), it is preferable that $X^{11}$ be H and $X^{12}$ be F, because a molded article much more excellent in resistance to bases and low-temperature resistance can be obtained.

Examples of the fluorine-containing monomers (11) include $CH_2=CFCF_3$, $CH_2=CFCF_2CF_3$, $CH_2=CFCF_2CF_2CF_3$, $CH_2=CFCF_2CF_2CF_2CF_3$ and $CHF=CHCF_3$ (1,3,3,3-tetrafluoropropene), and above all, $CH_2=CFCF_3$ (2,3,3,3-tetrafluoropropene) is preferable. The fluorine-containing monomer (11) may be one or two or more of the monomers.

Examples of the monomers giving a crosslinking site include:

an iodine- or bromine-containing monomer represented by $$CX^{13}{}_2=CX^{13}—Rf^{11}CHR^{11}X^{14} \quad \text{the general formula (12):}$$

wherein each $X^{13}$ is the same or different and is H, F or —$CH_3$, $Rf^{11}$ is a fluoroalkylene group, a perfluoroalkylene group, a fluoro(poly)oxyalkylene group or a perfluoro(poly)oxyalkylene group, $R^{11}$ is H or —$CH_3$, and $X^{14}$ is I or Br;

an iodine- or bromine-containing monomer represented by $$CX^{15}{}_2=CX^{15}—Rf^{12}X^{16} \quad \text{the general formula (13):}$$

wherein each $X^{15}$ is the same or different and is H, F or —$CH_3$, $Rf^{12}$ is a fluoroalkylene group, a perfluoroalkylene group, a fluoro(poly)oxyalkylene group or a perfluoro(poly)oxyalkylene group, and $X^{16}$ is I or Br, (preferably an iodine-containing monomer represented by the general formula: $CH_2=CH(CF_2)_nI$ wherein n is an integer of 2 to 8);

a monomer represented by $$CF_2=CFO(CF_2CF(CF_3)O)_m(CF_2)_n—X^{17} \quad \text{the general formula (14):}$$

wherein m is an integer of 0 to 5, n is an integer of 1 to 3, and $X^{17}$ is a cyano group, a carboxyl group, an alkoxycarbonyl group, I or Br, a monomer represented by $$CH_2=CFCF_2O(CF(CF_3)CF_2O)_m$$
$$(CF(CF_3))_n—X^{18} \quad \text{the general formula (15):}$$

wherein m is an integer of 0 to 5, n is an integer of 1 to 3, and $X^{18}$ is a cyano group, a carboxyl group, an alkoxycarbonyl group, I, Br or —$CH_2OH$, and a monomer represented by $$CR^{12}R^{13}=CR^{14}—Z—CR^{15}=CR^{16}CR^{17} \quad \text{the general formula (16):}$$

wherein $R^{12}$ to $R^{17}$ are the same or different and are each H or an alkyl group having 1 to 5 carbon atoms; and Z is an alkylene group having 1 to 18 carbon atoms, a cycloalkylene group having 3 to 18 carbon atoms, at least partially fluorinated alkylene or oxyalkylene group having 1 to 10 carbon atoms, each group being linear or branched chain and optionally having an oxygen atom, or a (per)fluoropolyoxyalkylene group represented by $$-(Q)_p-CF_2O—(CF_2CF_2O)_m(CF_2O)_n—CF_2-(Q)_p-$$

wherein Q is an alkylene or oxyalkylene group, p is 0 or 1, and m/n is 0.2 to 5, and having a molecular weight of 500 to 10,000.

Examples of the monomers represented by the general formula (16) include $CH_2=CH—(CF_2)_2—CH=CH_2$, $CH_2=CH—(CF_2)_4—CH=CH_2$, $CH_2=CH—(CF_2)_6—CH=CH_2$, and a monomer represented by the general formula: $CH_2=CH—Z^1—CH=CH_2$ wherein $Z^1$ is a fluoropolyoxyalkylene group represented by —$CH_2OCH_2—CF_2O—(CF_2CF_2O)_{m1}(CF_2O)_{n1}—CF_2—CH_2OCH_2—$, m1/n1 is 0.5, and the molecular weight is 2,000.

Above all, the monomer giving a crosslinking site is preferably at least one selected from the group consisting of $CF_2=CFOCF_2CF(CF_3)OCF_2CF_2CN$, $CF_2=CFOCF_2CF(CF_3)OCF_2CF_2COOH$, $CF_2=CFOCF_2CF(CF_3)OCF_2CF_2CH_2I$, $CF_2=CFOCF_2CF_2CH_2I$, $CH_2=CFCF_2OCF(CF_3)CF_2OCF(CF_3)CN$, $CH_2=CFCF_2OCF(CF_3)CF_2OCF(CF_3)COOH$, $CH_2=CFCF_2OCF(CF_3)CF_2OCF(CF_3)CH_2OH$, $CH_2=CHCF_2CF_2I$, and $CH_2=CH(CF_2)_2CH=CH_2$.

The monomer giving a crosslinking site is particularly preferably $CF_2=CFOCF_2CF_2CH_2I$ because this monomer enhances crosslink density to improve compression set in the crosslinking using an organic peroxide.

The molar ratio of the vinylidene fluoride unit/the unsaturated ether unit in the fluorine-containing elastomer is preferably 95/5 to 20/80, more preferably 93/7 to 50/50, still more preferably 93/7 to 60/40, and particularly preferably 93/7 to 70/30. The content of the another monomer unit is preferably 0 to 50 mol %, and more preferably 0 to 40 mol %, of all monomer units.

The fluorine-containing elastomer may have at least one of an iodine atom and a bromine atom, and may have an iodine atom. The total of the contents of iodine atoms and bromine atoms in the fluorine-containing elastomer is preferably 0.001 to 10 mass %, and the upper limit of the total of the contents of iodine atoms and bromine atoms is more preferably 5.0 mass % or less, still more preferably 1.0 mass % or less, particularly preferably 0.7 mass % or less, and most preferably 0.5 mass % or less, and the lower limit of the total of the contents of iodine atoms and bromine atoms is more preferably 0.01 mass % or more, still more preferably 0.05 mass % or more, particularly preferably 0.08 mass % or more, and most preferably 0.1 mass % or more. The bond position of an iodine atom and a bromine atom in the fluorine-containing elastomer may be an end of a main chain or an end of a side chain of the fluorine-containing elastomer, and as a matter of course, the positions may be both of them. In such a fluorine-containing elastomer, the iodine terminal or the bromine terminal becomes a crosslinking point (crosslinking site), so that a crosslinked fluorine-containing elastomer having high crosslink density is obtained, and besides, it becomes possible to carry out peroxide crosslinking more easily. The fluorine-containing elastomer may have an iodine atom or a bromine atom at one or both of a polymer main chain end and a side chain end. The fluorine-containing elastomer may be one obtained by a polymerization method using a bromine compound or an iodine compound as a chain transfer agent.

In the present disclosure, the content of each monomer unit is a value measured by an NMR method.

The number-average molecular weight (Mn) of the fluorine-containing elastomer is preferably 7,000 to 500,000, the weight-average molecular weight (Mw) thereof is preferably 10,000 to 1,000,000, and Mw/Mn thereof is preferably 1.3 to 4.0. The number-average molecular weight (Mn), the weight-average molecular weight (Mw) and Mw/Mn are values measured by a GPC method.

The Mooney viscosity (ML1+10 (100° C.)) of the fluorine-containing elastomer at 100° C. is preferably 2 or more, more preferably 5 or more, still more preferably 10 or more, and particularly preferably 30 or more, and is preferably 200 or less, more preferably 150 or less, still more preferably 100 or less, and particularly preferably 80 or less. The Mooney viscosity is a value measured in accordance with ASTM-D1646 and JIS K6300.

The fluorine-containing elastomer can be produced by a common radical polymerization method. The polymerization mode may be any mode of bulk polymerization, solution polymerization, suspension polymerization and emulsion polymerization, but solution polymerization and emulsion polymerization are preferable because they can be industrially easily carried out.

In the above polymerization, a polymerization initiator and a solvent can be used, and as each of them, a conventionally known one can be used.

In the polymerization for the fluorine-containing elastomer, the polymerization initiator may be an oil-soluble radical polymerization initiator or a water-soluble radical initiator.

The oil-soluble radical polymerization initiator may be a known oil-soluble peroxide, and typical examples thereof include dialkyl peroxycarbonates, such as diisopropyl peroxydicarbonate and di-sec-butyl peroxydicarbonate; peroxy esters, such as t-butyl peroxyisobutylate and t-butyl peroxypivalate; dialkyl peroxides, such as di-t-butyl peroxide; and di[perfluoro(or fluorochloro)acyl]peroxides, such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutylyl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutylyl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl peroxide, ω-chloro-hexafluorobutylyl-ω-chloro-decafluorohexanoyl peroxide, ω-hydrododecafluoroheptanoyl-perfluorobutylyl peroxide, di(dichloropentafluorobutanoyl)peroxide, di(trichlorooetafluorohexanoyl)peroxide, di(tetrachloroundecafluorooctanoyl)peroxide, di(pentachlorotetradecafluorodecanoyl)peroxide, and di(undecachlorotriacontafluorodocosanoyl)peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid and percarbonic acid, t-butyl permaleate, and t-butyl hydroperoxide. Reducing agents such as sulfites may also be contained together with the polymerization initiator, and the amount thereof used may be 0.1 to 20 times as much as the peroxide.

The amount of the radical polymerization initiator added is not limited, but the initiator in such an amount that the polymerization rate is not significantly decreased (e.g., concentration of several ppm based on water) only needs to be added at once or successively or continuously at the beginning of the polymerization. The upper limit is in a range in which heat of polymerization reaction can be removed from the device surface.

In the polymerization for the fluorine-containing elastomer, a surfactant may be used. The surfactant may be a nonionic surfactant, an anionic surfactant, a cationic surfactant or the like, and a linear or branched fluorine-containing anionic surfactant having 4 to 20 carbon atoms, such as ammonium perfluorohexanoate or ammonium perfluorooctanoate, is preferable. The amount added thereof (based on polywater) is preferably 10 ppm to 20 mass %, more preferably 10 ppm to 10 mass %, still more preferably 10 to 5,000 ppm, and particularly preferably 50 to 5,000 ppm. The surfactant may be a reactive emulsifier. The reactive emulsifier is not limited as long as it is a compound having one or more unsaturated bonds and one or more hydrophilic groups, and examples thereof include $CH_2=CFCF_2OCF(CF_3)CF_2OCF(CF_3)COONH_4$, $CH_2=CFCF_2CF(CF_3)OCF_2CF_2COONH_4$ and $CF_2=CFOCF_2CF(CF_3)OCF(CF_3)COONH_4$. The amount added thereof (based on polywater) is preferably 10 to 5,000 ppm. The amount added thereof is more preferably 50 to 5,000 ppm.

The solvent is preferably a solvent having no chain transfer property. In the case of solution polymerization, the solvent is, for example, dichloropentafluoropropane (R-225), and in the case of emulsion polymerization and suspension polymerization, the solvent is, for example, water, a mixture of water and a water-soluble organic solvent, or a mixture of water and a water-insoluble organic solvent.

In the polymerization for the fluorine-containing elastomer, chain transfer agents may be used. Examples of the chain transfer agents include not only esters, such as dimethyl malonate, diethyl malonate, methyl acetate, ethyl acetate, butyl acetate and dimethyl succinate, but also isopentane, methane, ethane, propane, isopropanol, acetone, various mercaptans, carbon tetrachloride and cyclohexane.

As the chain transfer agent, a bromine compound or an iodine compound may be used. A polymerization method that is carried out using a bromine compound or an iodine compound is, for example, a method in which emulsion polymerization is carried out in an aqueous medium in a substantially oxygen-free state in the presence of a bromine compound or an iodine compound while pressurizing (iodine transfer polymerization method). A typical example of the bromine compound or the iodine compound used is a compound represented by the general formula:

wherein x and y are each an integer of 0 to 2 and satisfy $1 \leq x+y \leq 2$, and $R^{18}$ is a saturated or unsaturated fluorohydrocarbon group or chlorofluorohydrocarbon group having 1 to 16 carbon atoms or a hydrocarbon group having 1 to 3 carbon atoms and may contain an oxygen atom. By using the bromine compound or the iodine compound, iodine or bromine is introduced into the polymer and functions as a crosslinking point.

Examples of the bromine compounds and the iodine compounds include monoiodomethane, 1-iodoethane, 1-iodo-n-propane, 1-iodoperfluoropropane, 2-iodoperfluoropropane, 1-iodoperfluorobutane, 1-iodoperfluoropentane, 1-iodoperfluorohexane, 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, CF$_2$Br$_2$, BrCF$_2$CF$_2$Br, CF$_3$CFBrCF$_2$Br, CFClBr$_2$, BrCF$_2$CFClBr, CFBrClCFClBr, BrCF$_2$CF$_2$CF$_2$Br, BrCF$_2$CFBrOCF$_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, a monoiodomonobromo substitution product of benzene, a diiodomonobromo substitution product, and (2-iodoethyl) and (2-bromoethyl) substitution products. These compounds may be used singly, or can also be used in combination with one another.

In the polymerization for the fluorine-containing elastomer, the polymerization temperature, the polymerization pressure and the polymerization time may be −15 to 150° C., atmospheric pressure to about 6.5 MPa, and 1 to 24 hours, respectively, though they vary depending upon the types of the solvent and the polymerization initiator. Particularly when an oil-soluble radical polymerization initiator having a fluorine atom is used as the polymerization initiator in the solution polymerization, the polymerization temperature is preferably −15 to 50° C., and more preferably 10 to 35° C. When an oil-soluble radical polymerization initiator having a fluorine atom is used in the emulsion polymerization and the suspension polymerization, the polymerization temperature is preferably 30 to 95° C. When a water-soluble radical polymerization initiator is used as the polymerization initiator, the polymerization temperature is preferably 0 to 100° C., and more preferably 10 to 95° C.

The fluorine-containing elastomer obtained by the polymerization may be in any form such as an aqueous dispersion or a powder.

In the case of emulsion polymerization, the powder of the fluorine-containing elastomer can be obtained by coagulating a dispersion as polymerized, and performing washing with water, dehydrating and drying. The coagulation can be carried out by adding an inorganic salt such as aluminum sulfate or an inorganic acid, or applying mechanical shear force, or freezing the dispersion. In the case of suspension polymerization, the powder can be obtained by recovering the elastomer from the dispersion as polymerized and drying it. In the case of solution polymerization, the powder can be obtained by drying a solution containing the fluorine-containing elastomer, as it is, or can also be obtained by dropwise adding a poor solvent and performing purification.

By using the fluorine-containing elastomer of the present disclosure, a molded article excellent in low-temperature resistance and resistance to bases can be obtained. The fluorine-containing elastomer of the present disclosure can be used together with a cross-linking agent, and owing to this, a molded article excellent in low-temperature resistance and resistance to bases can also be obtained.

The crosslinkable composition of the present disclosure contains the above-mentioned fluorine-containing elastomer and a cross-linking agent.

The content of the cross-linking agent in the crosslinkable composition is preferably 0.01 to 10 parts by mass, and more preferably 0.1 to 5 parts by mass, based on 100 parts by mass of the fluorine-containing elastomer. If the amount of the cross-linking agent is too small, the degree of crosslinking is insufficient, so that the performance of the resulting molded article tends to be impaired, and if the amount of the cross-linking agent is too large, the crosslink density becomes too high, resulting in not only a long crosslinking time but also unfavorable economic efficiency.

The cross-linking agent is not limited as long as it is any of cross-linking agents usually used in polyamine crosslinking, polyol crosslinking and peroxide crosslinking, but the cross-linking agent is preferably at least one selected from the group consisting of a polyamine compound, a polyhydroxy compound and an organic peroxide, and is more preferably an organic peroxide.

Examples of the polyamine compounds include hexamethylenediamine carbamate, N,N'-dicinnamylidene-1,6-hexamethylenediamine, and 4,4'-bis(aminocyclohexyl)methane carbamate. Among these, N,N'-dicinnamylidene-1,6-hexamethylenediamine is preferable.

From the viewpoint of excellent heat resistance, a polyhydroxy aromatic compound is preferably used as the polyhydroxy compound.

Examples of the polyhydroxy aromatic compounds include, but are not limited to, 2,2-bis(4-hydroxyphenyl)propane (referred to as bisphenol A hereinafter), 2,2-bis(4-hydroxyphenyl)perfluoropropane (referred to as bisphenol AF hereinafter), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (referred to as bisphenol B hereinafter), 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyhydroxy aromatic compounds may be alkaline metal salts, alkaline earth metal salts or the like, but when a copolymer is coagulated by the use of an acid, it is preferable that the metal salts should not be used.

When the cross-linking agent is a polyhydroxy compound, the crosslinkable composition preferably contains a crosslinking accelerator. The crosslinking accelerator accelerates formation of an intramolecular double bond in the dehydrofluorination reaction of the fluorine-containing elastomer main chain and addition of the polyhydroxy compound to the double bond formed.

Examples of the crosslinking accelerators include onium compounds, and among the onium compounds, at least one selected from the group consisting of an ammonium compound such as a quaternary ammonium salt, a phosphonium compound such as a quaternary phosphonium salt, an oxonium compound, a sulfonium compound, a cyclic amine and a monofunctional amine compound is preferable, and at least one selected from the group consisting of a quaternary ammonium salt and a quaternary phosphonium salt is more preferable.

Examples of the quaternary ammonium salts include, but are not limited to, 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methyl sulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride (referred to as DBU-B hereinafter), 8-benzyl-1,8-diazabicyclo[5.4.0]-7-undecenium hydroxide, 8-phenethyl-1,8-diazabicyclo[5.4.0]-7-undecenium chloride, and 8-(3-phenylpropyl)-1,8-diazabicyclo[5.4.0]-7-undecenium chloride. Among these, DBU-B is preferable from the viewpoints of excellent crosslinkability and physical properties of a molded article.

Examples of the quaternary phosphonium salts include, but are not limited to, tetrabutylphosphonium chloride, benzyltriphenylphosphonium chloride (referred to as BTPPC hereinafter), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride. Among these, benzyltriphenylphosphonium chloride (BTPPC) is preferable from the viewpoints of excellent crosslinkability and physical properties of a molded article.

The crosslinking accelerator may be a solid solution of a quaternary ammonium salt, a quaternary phosphonium salt and bisphenol AF, or a chlorine-free crosslinking accelerator disclosed in Japanese Patent Laid-Open No. 11-147891.

The blending amount of the crosslinking accelerator is preferably 0.01 to 8 parts by mass, and more preferably 0.02 to 5 parts by mass, based on 100 parts by mass of the fluorine-containing elastomer. If the amount of the crosslinking accelerator is too small, crosslinking of the fluorine-containing elastomer does not sufficiently proceed, so that heat resistance and oil resistance of the resulting molded article tend to lower, and if the amount of the crosslinking accelerator is too large, molding processability of the crosslinkable composition tends to lower.

The organic peroxide only needs to be an organic peroxide capable of easily generating a radical in the presence of heat or oxidation-reduction system, and examples thereof include 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butyl peroxymaleic acid, t-butyl peroxyisopropyl carbonate, and t-butyl peroxybenzoate. Among these, 2,5-dimethyl-2,5-di(t-butylperoxy)hexane and 2,5-dimethyl-2,5-di(t-butylperoxy)-hexyne-3 are preferable.

When the cross-linking agent is an organic peroxide, the crosslinkable composition preferably contains a crosslinking aid. Examples of the crosslinking aids include triallyl cyanurate, trimethallyl isocyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris (2,3,3-trifluoro-2-propenyl)-1,3,5-triazine-2,4,6-trione), tris (diallylamine)-S-triazine, triallyl phosphite, N,N-diallylacrylamide, 1,6-divinyldodecafluorohexane, hexaallylphosphoramide, N, N,N',N'-tetraallylphthalamide, N,N,N',N'-tetraallylmalonamide, trivinyl isocyanurate, 2,4,6-trivinylmethyltrisiloxane, tri(5-norbornene-2-methylene) cyanurate, and triallyl phosphite. Among these, triallyl isocyanurate (TAIC) is preferable from the viewpoints of excellent crosslinkability and physical properties of a molded article.

The blending amount of the crosslinking aid is preferably 0.01 to 10 parts by mass, and more preferably 0.1 to 5.0 parts by mass, based on 100 parts by mass of the fluorine-containing elastomer. If the amount of the crosslinking aid is too small, the crosslinking time tends to become too long to endure practical use, and if the amount of the crosslinking aid is too large, not only does the crosslinking time become too short but also the compression set of a molded article tends to lower.

The polyamine crosslinking using a polyamine compound as the cross-linking agent can be carried out in the same way as before. For example, there is a method in which the fluorine-containing elastomer, the cross-liking agent, and if necessary, a crosslinking accelerator and other additives that are appropriately mixable are subjected to roll milling, then placed in a mold, and pressurized to perform primary crosslinking, followed by performing secondary crosslinking. In general, the conditions of the primary crosslinking are adopted from ranges of a temperature of 100 to 200° C., a time of 5 to 120 minutes, and a pressure of about 2 to 10 MPa, and the conditions of the secondary crosslinking are adopted from ranges of a temperature of 150 to 300° C. and a time of about 30 minutes to 30 hours.

The polyol crosslinking using a polyhydroxy compound as the cross-linking agent can be carried out in the same way as before. For example, there is a method in which the fluorine-containing elastomer, the cross-liking agent, and if necessary, a crosslinking accelerator and other additives that are appropriately mixable are subjected to roll milling, then placed in a mold, and pressurized to perform primary crosslinking, followed by performing secondary crosslinking. For kneading, an internal mixer, a Banbury mixer, or the like can be preferably used. In general, the primary crosslinking can be carried out at 2 to 10 MPa and 100 to 200° C. for 5 to 60 minutes, and the secondary crosslinking can be carried out at 150 to 300° C. for 30 minutes to 30 hours.

The peroxide crosslinking using an organic peroxide as the cross-linking agent can be carried out in the same way as before. For example, there is a method in which the fluorine-containing elastomer, the cross-liking agent, and if necessary, a crosslinking accelerator and other additives that are appropriately mixable are subjected to roll milling, then placed in a mold, and pressurized to perform primary crosslinking, followed by performing secondary crosslinking. In general, the primary crosslinking can be carried out at 2 to 10 MPa and 100 to 200° C. for 5 to 60 minutes, and the secondary crosslinking can be carried out at 150 to 300° C. for 30 minutes to 30 hours.

The crosslinkable composition also preferably contains a filler. Examples of the fillers include metal oxides, such as calcium oxide, titanium oxide and aluminum oxide; metal hydroxides, such as magnesium hydroxide, aluminum hydroxide and calcium hydroxide; carbonates, such as magnesium carbonate, aluminum carbonate, calcium carbonate and barium carbonate; silicates, such as magnesium silicate, calcium silicate, sodium silicate and aluminum silicate; sulfates, such as aluminum sulfate, calcium sulfate and barium sulfate; synthetic hydrotalcite, metal sulfides, such as molybdenum disulfide, iron sulfide and copper sulfide; diatomaceous earth, asbestos, lithopone (zinc sulfide/barium sulfide), graphite, carbon black, carbon fluoride, calcium fluoride, coke, quartz fine powder, zinc white, talc, mica powder, wollastonite, carbon fiber, aramid fiber, various whiskers, glass fiber, organic reinforcement, organic filler, polytetrafluoroethylene, mica, silica, celite and clay.

The crosslinkable composition also preferably contains a plasticizer. Examples of the plasticizers include dioctylphthalic acid and pentaerythritol.

The crosslinkable composition also preferably contains a processing aid. Examples of the processing aids include higher fatty acids, such as stearic acid, oleic acid, palmitic acid and lauric acid; higher fatty acid salts, such as sodium stearate and zinc stearate; higher fatty acid amides, such as stearic acid amide and oleic acid amide; higher fatty acid esters, such as ethyl oleate; higher aliphatic amines, such as stearylamine and oleylamine; petroleum-based waxes, such as carnauba wax and ceresin wax; polyglycols, such as ethylene glycol, glycerol and diethylene glycol; aliphatic hydrocarbons, such as vaseline and paraffin; silicone-based oil, silicone-based polymer, low-molecular weight polyethylene, phthalic acid esters, phosphoric acid esters, rosin, (halogenated) dialkylamine, a surfactant, a sulfone compound, and a fluorine-based aid.

The crosslinkable composition may contain an acid acceptor, a mold release agent, a pigment, a flame retarder, a lubricant, a light stabilizer, a weathering stabilizer, an antistatic agent, an ultraviolet absorbing agent, an antioxidant, a foaming agent, a perfume, an oil, a softener, etc. within the limits not exerting influence on the effects of the present disclosure.

The crosslinkable composition may be one containing a solvent. When the fluorine-containing elastomer is dissolved in a solvent, the composition can be used as a coating material. Examples of the solvents include a ketone-based solvent and an ester-based solvent.

The crosslinkable composition may contain other polymers different from the fluorine-containing elastomer. Examples of the other polymers include nitrile rubber, acrylic rubber, epichlorohydrin rubber, fluorosilicone rubber, silicone rubber, fluorine-containing thermoplastic elastomer and polyvinylidene fluoride.

The crosslinkable composition is preferably one obtained by kneading at least the fluorine-containing elastomer and a cross-linking agent, and if desired, the aforesaid crosslinking accelerator, etc.

For the kneading, an open roll, a Banbury mixer, a pressure kneader, an extruder, or the like can be used, but a pressure kneader or an extruder such as a twin-screw extruder is preferably used because high shear force can be applied.

By molding the above-mentioned fluorine-containing elastomer or the above-mentioned crosslinkable composition, a molded article can be obtained. Alternatively, by molding and crosslinking the crosslinkable composition, a molded article (crosslinked rubber molded article) may also be obtained. The resulting molded article is excellent in low-temperature resistance and resistance to bases.

The crosslinked rubber molded article can also be produced by molding the crosslinkable composition and crosslinking the resulting molded article, or can also be produced by carrying out molding and crosslinking at the same time. Alternatively, the crosslinked rubber molded article can also be obtained as a coating film by applying the crosslinkable composition and crosslinking it.

Examples of the molding methods include, but are not limited to, compression molding, extrusion molding, transfer molding and injection molding.

Crosslinking can be carried out by a usual method, such as a method of heating and compressing the composition in a mold, a method of injecting the composition into a heated mold, or a method of extruding the composition by an extruder and then crosslinking the composition. By carrying out primary crosslinking and secondary crosslinking in this order, the crosslinked rubber molded article can be obtained.

The primary crosslinking is preferably carried out at 150 to 230° C. for 5 to 120 minutes, more preferably carried out at 160 to 200° C. for 15 to 90 minutes, and particularly preferably carried out at 160 to 190° C. for 30 to 90 minutes. The crosslinking means may be known crosslinking means, and is, for example, press crosslinking.

The secondary crosslinking is preferably carried out at 160 to 320° C. for 2 to 168 hours, and more preferably carried out at 180 to 310° C. for 4 to 36 hours. The crosslinking means may be known crosslinking means, and is, for example, oven crosslinking.

The molded article of the present disclosure has excellent heat resistance, oil resistance, amine resistance, chemical resistance and low temperature resistance, and it is generally used for parts that slide by the contact with other materials or seal or tightly seal other materials or substances or aim at vibration insulation or soundproofing, and it can be used as any of various parts in fields of automobile industry, aircraft industry, semiconductor industry, etc.

Examples of the fields of use include a semiconductor-related field, an automobile field, an aircraft field, a space/rocket field, a ship field, a chemical product field such as chemical plant, a pharmaceutical field such as drugs, a photographic field such as a developing machine, a printing field such as a printing machine, a coating field such as coating equipment, an analytical/physical and chemical equipment field such as analytical equipment and instruments, a food equipment field including food plant equipment and household goods, a beverage/food manufacturing device field, a drug manufacturing device field, a medical component field, a chemical agent transportation equipment field, a nuclear plant equipment field, an iron and steel field such as iron plate processing equipment, a general industrial field, an electric field, a fuel cell field, an electronic component field, an optical equipment component field, a space equipment component field, a petrochemical plant equipment field, a field of equipment components for exploration and mining of energy resources such as petroleum and gas, a petroleum refining field, and a petroleum transportation equipment component field.

Examples of use forms of the molded article of the present disclosure include various seal materials and packings, such as rings, packings, gaskets, diaphragms, oil seals, bearing seals, lip seals, plunger seals, door seals, lip and face seals, gas delivery plate seals, wafer support seals and barrel seals. The seal materials can be used in applications requiring heat resistance, solvent resistance, chemical resistance and non-stickiness.

The crosslinked rubber molded article of the present disclosure can also be used as any of tubes, hoses, rolls, various rubber rolls, flexible joints, rubber plates, coatings, belts, dampers, valves, valve seats, valve bodies of valves, chemical-resistant coating materials, laminating materials, lining materials, etc.

The sectional shapes of the above rings, packings and seals may be various shapes, and they may be specifically shapes such as square shape, O-shape, and ferrule shape, or may be irregular shapes such as D-shape, L-shape, T-shape, V-shape, X-shape and Y-shape.

In the semiconductor-related field, the crosslinked rubber molded article can be used in, for example, semiconductor manufacturing equipment, liquid crystal panel manufacturing equipment, plasma panel manufacturing equipment, plasma display panel manufacturing equipment, plasma address liquid crystal panel manufacturing equipment, organic EL panel manufacturing equipment, field emission display panel manufacturing equipment, solar cell substrate manufacturing equipment, and semiconductor transfer equipment. Examples of such equipment include CVD equipment, gas control equipment such as semiconductor gas control equipment, dry etching equipment, wet etching equipment, plasma etching equipment, reactive ion etching equipment, reactive ion beam etching equipment, sputter etching equipment, ion beam etching equipment, oxidation diffusion equipment, sputtering equipment, ashing equipment, plasma ashing equipment, cleaning equipment, ion injection equipment, plasma CVD equipment, ventilation equipment, exposure equipment, abrasion equipment, film-forming equipment, dry etching cleaning equipment, UV/O₃ cleaning equipment, ion beam cleaning equipment, laser beam cleaning equipment, plasma cleaning equipment, gas etching cleaning equipment, extraction cleaning equipment, Soxhlet extraction cleaning equipment, high-temperature high-pressure extraction cleaning equipment, microwave extraction cleaning equipment, supercritical extraction cleaning equipment, cleaning equipment using hydrofluoric acid, hydrochloric acid, sulfuric acid, ozone water or the like, stepper, coater/developer, CMP equipment, excimer laser exposure machine, chemical liquid pipe, gas pipe, equipment for carrying out plasma treatment such as $NF_3$ plasma treatment, $O_2$ plasma treatment or fluorine plasma treatment, heat treatment film-forming equipment, wafer transfer equipment, wafer cleaning equipment, silicon wafer cleaning equipment, silicon wafer processing equipment, equipment used in LP-CVD process, equipment used in lamp annealing process, and equipment used in reflow process.

Examples of specific use forms in the semiconductor-related field include various seal materials, such as gate valves, quartz windows, chambers, chamber lids, gates, bell jars, couplings, and O-rings and gaskets of pumps; various seal materials for resist developing solution or stripping solution, such as O-rings, hoses, and tubes; linings and coatings for resist developing solution tanks, stripping solution tanks, wafer cleaning liquid tanks and wet etching tanks; diaphragms for pumps; rolls for wafer transfer; hoses and tubes for wafer cleaning liquid; seal materials for clean facilities, e.g., sealants for clean facilities such as clean rooms; sealing materials for storerooms for storing semiconductor manufacturing equipment or devices such as wafer; and chemical liquid transfer diaphragms used in a process for manufacturing semiconductors.

In the automobile field, the molded article of the present disclosure can be used in engine body, main motor system, valve train system, lubrication/cooling system, fuel system, intake/exhaust system, transmission system of drive system, steering system of chassis, and brake system, and for electrical components such as basic electrical components, control system electrical components and equipment electrical components. In the automobile field, motorcycles are also included.

In such engine body as above and its peripheral equipment, the molded article of the present disclosure can be used for various seal materials requiring heat resistance, oil resistance, fuel oil resistance, resistance to antifreezing solutions for engine cooling, and steam resistance, and examples of such seal materials include seals, such as gaskets, shaft seals and valve stem seals, non-contact type or contact type packings, such as self-seal packings, piston rings, split-ring type packings, mechanical seals and oil seals, bellows, diaphragms, hoses, tubes, and various seal materials used for electric wires, buffer materials, anti-vibration materials and belt AT equipment.

Examples of specific use forms in the fuel system include O-rings used for fuel injector, cold start injector, quick connector of fuel line, sender/flange/quick connector, fuel pump, fuel tank/quick connector, gasoline mixing tank, gasoline pump, tube body of fuel tube, connector of fuel tube, injector, etc.; seals used for exhalation system manifold, fuel filter, pressure control valve, canister, cap of fuel tank, fuel pump, fuel tank, sender unit of fuel tank, fuel injection equipment, fuel high-pressure pump, fuel line connector system, pump timing control valve, suction control valve, solenoid sub-assembly, fuel cut valve, etc.; canister purge solenoid valve seals, onboard refueling vapor recovery (ORVR) valve seals, oil seals for fuel pumps, fuel sender seals, fuel tank rollover valve seals, filler seals, injector seals, filler cap seals, seals of filler cap valves; hoses, such as fuel hoses, fuel supply hoses, fuel return hoses, vapor (evaporation) hoses, vent (breather) hoses, filler hoses, filler neck hoses, hoses in fuel tanks (in-tank hoses), control hoses of carburetors, fuel inlet hoses, and fuel breather hoses; gaskets used for fuel filter, fuel line connector system, etc., and flange gaskets used for carburetor, etc.; line materials for steam recovery line, fuel feed line, vapor ORVR line, etc.; diaphragms used for canister, ORVR, fuel pump, fuel tank pressure sensor, gasoline pump, sensor of carburetor, combined air control equipment (CAC), pulsation damper, canister, autocock, etc., and pressure regulator diaphragms of fuel injection equipment; valves for fuel pumps, carburetor needle valves, rollover check valves, check valves; tubes used for vent (breather) or used in fuel tank; tank packings for fuel tank, etc., packings for acceleration pump piston of carburetor; fuel sender anti-vibration components for fuel tank; O-rings and diaphragms for control of fuel pressure; accelerator pump cups; in-tank fuel pump mounts; injector cushion rings of fuel injection equipment; injector seal rings; needle valve core valves of carburetors; acceleration pump pistons of carburetors; valve seats of combined air control equipment (CAC); fuel tank bodies; and seal components for solenoid valves.

Examples of specific use forms in the brake system include diaphragms used for master back, hydraulic brake hose air brake, brake chamber of air brake, etc.; hoses used for brake hose, brake oil hose, vacuum brake hose, etc.; various seal materials, such as oil seals, O-rings, packings and brake piston seals; breather valves and vacuum valves for master backs, check valves for brake valves; piston cups (rubber cups) for master cylinders, brake cups; boots for master cylinder and vacuum booster of hydraulic brake and wheel cylinder of hydraulic brake, and O-rings and grommets for antilock brake system (ABS).

Examples of specific use forms in the basic electrical components include insulators and sheaths of electric wires (harness), tubes of harness exterior components, and grommets for connectors.

Examples of specific use forms in the control system electrical components include coating materials for various sensor wires.

Examples of specific use forms in the equipment electrical components include O-rings and packings for car air conditioner, cooler hoses, high-pressure air conditioner hoses, air conditioner hoses, gaskets for electronic throttle unit, plug boots for direct ignition, and diaphragms for distributer. The crosslinked rubber molded article can also be used for adhesion of electrical components.

Examples of specific use forms in the intake/exhaust system include packings used for intake manifold, exhaust manifold, etc., throttle body packings for throttle; diaphragms used for EGR (exhaust gas recirculation), pressing control (BPT), wastegate, turbo wastegate, actuator, actuator of variable turbine geometry (VTG) turbo, exhaust purification valve, etc.; hoses, such as control hoses for EGR (exhaust gas recirculation), emission control hoses, turbo oil hoses for turbo charger (supply), turbo oil hoses (return), turbo air hoses, intercooler hoses, turbo charger hoses, hoses to be connected to compressors of turbo engines equipped with intercooler, exhaust gas hoses, air intake hoses, turbo hoses, and DPF (diesel particulate filter) sensor hoses; airducts and turbo airducts; intake manifold gaskets; seal materials for EGR, afterburn prevention valve seats of AB valves, turbine shaft seals (of turbo charger, etc.), and seal members used for groove parts such as rocker cover and air intake manifold used in engine of automobile.

In addition, in the exhaust gas control components, the crosslinked rubber molded article can be used as any of seals used for steam recovery canister, catalytic converter, exhaust gas sensor, oxygen sensor, etc. and seals of solenoid armatures for steam recovery and steam canister; intake system manifold gaskets, etc.

In the components related to diesel engine, the crosslinked rubber molded article can be used as any of O-ring seals for direct injection injector, rotary pump seals, control diaphragms, fuel hoses, diaphragms for EGR, priming pump and boost compensator, etc. Moreover, it can also be used for O-rings, seal materials, hoses, tubes and diaphragms used for urea SCR system, seal materials for urea water tank body and urea water tank of urea SCR system, etc.

Examples of specific use forms in the transmission system include transmission-related bearing seals, oil seals, O-rings, packings and torque converter hoses.

Transmission oil seals, transmission oil hoses of AT, ATF hoses, O-rings, packings, etc. are also included.

Examples of transmissions include AT (automatic transmission), MT (manual transmission), CVT (continuously variable transmission), and DCT (dual clutch transmission).

Oil seals, gaskets, O-rings and packings for manual or automatic transmission, oil seals, gaskets, O-rings and packings for continuously variable transmission (belt type or toroidal type), packings for ATF linear solenoid, oil hoses for manual transmission, ATF hoses for automatic transmission, CVTF hoses for continuously variable transmission (belt type or toroidal type), etc. are also included.

Examples of specific use forms in the steering system include power steering oil hoses and high-pressure power steering hoses.

Examples of forms used in the engine body of automobile engine include gaskets such as cylinder head gaskets, cylinder head cover gaskets, oil pan packings and common gaskets, seals such as O-rings, packings and timing belt cover gaskets, hoses such as control hoses, rubber vibration insulators for engine mounts, control valve diaphragms, and camshaft oil seals.

In the main motor system of automobile engine, the crosslinked rubber molded article can be used for shaft seals such as crankshaft seals and camshaft seals, etc.

In the valve train system of automobile engine, the crosslinked rubber molded article can be used for valve stem oil seals of engine valves, valve seats of butterfly valves, etc.

In the lubrication/cooling system of automobile engine, the crosslinked rubber molded article can be used not only for engine oil cooler hoses for engine oil coolers, oil return hoses, seal gaskets, water hoses around radiators, seals for radiators, gaskets for radiators, O-rings for radiators, vacuum pump oil hoses for vacuum pumps, etc. but also for radiator hoses, radiator tanks, diaphragms for oil pressure, fan coupling seals, etc.

As described above, some specific examples of uses in the automobile field include engine head gasket, oil pan gasket, manifold packing, seal for oxygen sensor, oxygen sensor bush, seal for nitrogen oxide ($NO_x$) sensor, nitrogen oxide ($NO_x$) sensor bush, seal for sulfur oxide sensor, seal for temperature sensor, temperature sensor bush, seal for diesel particulate filter sensor, diesel particulate filter sensor bush, injector O-ring, injector packing, O-ring and diaphragm for fuel pump, gear box seal, power piston packing, seal of cylinder liner, seal of valve stem, static valve stem seal, dynamic valve stem seal, front pump seal of automatic transmission, rear axle pinion seal, gasket of universal joint, pinion seal of speed meter, piston cup of foot brake, O-ring and oil seal of torque transmission device, seal and bearing seal of discharge gas re-combustion device, hose for re-combustion device, diaphragm for sensor of carburetor, rubber vibration insulator (engine mount, exhaust part, muffler hanger, suspension bush, center bearing, strut bumper rubber, etc.), rubber vibration insulator for suspension, (strut mount, bush, etc.), drive system rubber vibration insulator (damper, etc.), fuel hose, tube and hose for EGR, twin cab tube, core valve of needle valve of carburetor, flange gasket of carburetor, oil hose, oil cooler hose, ATF hose, cylinder head gasket, water pump seal, gear box seal, needle valve tip, reed of reed valve for motorcycle, oil seal of automobile engine, seal of gasoline hose gun, seal for car air conditioner, rubber hose for intercooler of engine, seal of fuel line connector systems, CAC valve, needle tip, electric wire around engine, filler hose, car air conditioner O-ring, intake gasket, fuel tank material, diaphragm for distributer, water hose, clutch hose, PS hose, AT hose, master back hose, heater hose, air conditioner hose, ventilation hose, oil filler cap, PS rack seal, rack & pinion boot, CVJ boot, ball joint dust cover, strut dust cover, weatherstrip, glass run, center unit packing, body sight welt, bumper rubber, door latch, dash insulator, high tension cord, flat belt, poly-V belt, timing belt, toothed belt, V-ribbed belt, tire, wiper blade, diaphragm and plunger for LPG car regulator, diaphragm and valve for CNG car regulator, DME compatible rubber part, diaphragm and boot of auto tensioner, diaphragm and valve of idle speed control, actuator of auto speed control, diaphragm and check valve and plunger of negative pressure pump, diaphragm and O-ring of O.P.S., gasoline pressure release valve, O-ring and gasket of engine cylinder sleeve, O-ring and gasket of wet cylinder sleeve, seal and gasket of differential gear (seal and gasket for gear oil), seal and gasket of power steering device (seal and gasket of PSF), seal and gasket of shock absorber (seal and gasket of SAF), seal and gasket of constant velocity joint, seal and gasket of wheel bearing, coating agent for metal gasket, caliper seal, boots, wheel bearing seal, and bladder used for vulcanization molding of tire.

In the aircraft field, the space/rocket field and the ship field, the crosslinked rubber molded article can be used particularly in the fuel system and the lubricating oil system.

In the aircraft field, it is possible to use the crosslinked rubber molded article as, for example, any of various seal parts for aircrafts, various aircraft parts for aircraft engine oil, jet engine valve stem seals and gaskets and O-rings, rotating shaft seals, gaskets for hydraulic equipment, firewall seals, hoses and gaskets and O-rings for fuel supply, and cables and oil seals and shaft seals for aircrafts.

In the space/rocket field, the crosslinked rubber molded article can be used as, for example, any of lip seals and diaphragms and O-rings for spaceship, jet engine, missile, etc., O-rings for gas-resistant turbine engine oil, and anti-vibration stand pads for missile ground control.

In the ship field, the crosslinked rubber molded article can be used as, for example, any of screw propeller shaft stern seals, intake or exhaust valve stem seals for diesel engine, valve seals for butterfly valves, valve seats and shaft seals for butterfly valves, shaft seals for butterfly valves, stern tube seals, fuel hoses, gaskets, O-rings for engines, marine cables, marine oil seals, and marine shaft seals.

In the chemical product field such as chemical plant and the pharmaceutical field such as drugs, the crosslinked rubber molded article can be used in processes requiring high degree of chemical resistance, for example, processes for producing chemical products such as drugs, agricultural chemicals, coating materials and resins.

Examples of specific use forms in the chemical product field and the pharmaceutical field include seals used for chemical equipment, pump for chemical agents, flow meter, pipe for chemical agents, heat exchanger, agricultural chemical sprayer, agricultural chemical transfer pump, gas pipe, fuel cell, analytical equipment and physical and chemical equipment (e.g., column fitting of analytical equipment and instruments), expansion joints for flue gas desulfurization device, nitric acid plant, power plant turbine, etc., seals used for medical sterilization process, seals for plating solutions, roller seals for papermaking belt, joint seals for wind tunnel; O-rings used for chemical devices such as reactor and stirrer, analytical equipment and instruments, chemical pump, pump housing, valve, tachometer, etc., O-rings for mechanical seal, O-rings for compressor sealing; packings used for high-temperature vacuum dryer, gas chromatography, tube connection part of pH meter, etc., glass cooler packings for sulfuric acid production equipment; diaphragms used for diaphragm pump, analytical equipment, physical and chemical equipment, etc.; gaskets used for analytical equipment and instruments; thimbles (ferrules) used for analytical equipment and instruments; valve seats; U-cups; linings used for chemical device, gasoline tank, wind tunnel, etc., corrosion-resistant linings of anodized aluminum processing tank; coatings of masking jig for plating; valve parts of analytical equipment and physical and chemical equipment; expansion joints for flue gas desulfurization plant; hoses resistant to acids such as concentrated sulfuric acid, chlorine gas transfer hoses, oil-resistant hoses, rainwater drain hoses for benzene or toluene storage tank; chemical-resistant tubes used for analytic equipment, physical and chemical equipment, etc., medical tubes; trichloroethylene-resistant rolls for fiber dyeing, and dyeing rolls; medicine plugs for drugs; medical rubber plugs; chemical bottles, chemical tanks, bags, chemical containers; and protection equipment such as gloves and boots resistant to strong acids and solvents.

In the photographic field such as a developing machine, the printing field such as a printing machine, and the coating field such as coating equipment, the crosslinked rubber molded article can be used as any of rolls, belts, seals, valve parts, etc. of dry copying machines.

Examples of specific use forms in the photographic field, the printing field and the coating field include surface layers of transfer rolls of copying machines, cleaning blades of copying machines, belts of copying machines; rolls (e.g., fixing roll, pressing roll, pressure roll) and belts for OA equipment such as copying machine, printer and facsimile; rolls, roll blades and belts of PPC copying machines; rolls of film developing machines and X-ray film developing machines; printing rolls, scrapers, tubes, valve parts and belts of printing machines; ink tubes, rolls and belts of printers; coating rolls, scrapers, tubes and valve parts of coating/painting equipment; developing rolls, gravure rolls, guide rolls, guide rolls of magnetic tape production coating line, gravure rolls of magnetic tape production coating line, and coating rolls.

In the food equipment field including food plant equipment and household goods, the crosslinked rubber molded article can be used in a food production process and for a food transporter or a food storage container.

Examples of specific use forms in the food equipment field include seals for plate type heat exchangers, solenoid valve seals for vending machines, packings for jar pots, sanitary pipe packings, packings for pressure cookers, water heater seals, gaskets for heat exchangers, diaphragms and packings for food processing treatment devices, and rubber materials for food processing treatment machines (e.g., various seals such as heat exchanger gasket, diaphragm and O-ring, pipe, hose, sanitary packing, valve packing, filling packing used as joint between mouth of bottle and filler when filling). Also included are packings, gaskets, tubes, diaphragms, hoses, joint sleeves, etc. which are used for products such as alcoholic beverages and soft drinks, filling device, food sterilization device, brewing device, water heater, various automatic food vending machines, etc.

In the nuclear plant equipment field, the crosslinked rubber molded article can be used for check valves and pressure reducing valves around nuclear reactors, seals of uranium hexafluoride concentrators, etc.

Examples of specific use forms in the general industrial field include seal materials for hydraulic equipment such as machine tool, construction machine and hydraulic machine; seals and bearing seals for hydraulic and lubrication machines; seal materials used for mandrel, etc.; seals used for windows, etc. of dry cleaning equipment; seals and (vacuum) valve seals of cyclotron, seals of proton accelerators, seals of automatic packaging machines, diaphragms of pumps for analytical devices (pollution measuring instruments) for sulfurous acid and chlorine gas in the air, snake pump linings, rolls and belts of printers, conveying belts (conveyer belts), squeeze rolls for pickling of iron plate and the like, cables of robots, solvent squeeze rolls for aluminum rolling line, etc., coupler O-rings, acid-resistant cushion materials, dust seals and lip rubbers on sliding parts of cutting machines, gaskets of garbage incinerators, frictional materials, surface modifiers for metals or rubbers, and covering materials. Moreover, it can also be used as any of gaskets and seal materials of devices used for papermaking process, sealants for clean room filter unit, sealants for construction, protective coating agents for concrete, cement and the like, glass cloth impregnating materials, processing aids for polyolefin, moldability improving additives for polyethylene, fuel containers for small generator, lawn mower and the like, precoated metals obtained by subjecting metal plates to primer treatment, etc. In addition, it can also be used as any of sheets and belts obtained by impregnation of fabrics and baking.

Examples of specific use forms in the iron and steel field include iron plate processing rolls of iron plate processing equipment.

Examples of specific use forms in the electrical field include insulating oil caps for the Shinkansen, benching seals for liquid-sealed transformers, seals for transformers, jackets of oil well cables, seals for furnaces such as electric furnace, window frame seals for microwave ovens, seal materials used when bonding of wedges and necks of CRT, seal materials for halogen lamps, fixing agents for electrical components, seal materials for end treatment of sheath heaters, and seal materials used for insulation and moisture proofing treatment of electrical equipment lead wire terminals. Moreover, the crosslinked rubber molded article can also be used as any of covering materials for oil-resistant heat-resistant wires, highly heat-resistant wires, chemical-resistant wires, highly insulating wires, high-voltage transmission lines, cables, wires used in geothermal power generation equipment, and wires used around automobile engines. It can also be used for oil seals and shaft seals for vehicle cables. Furthermore, it can also be used for electrical insulating materials (e.g., insulating spacers for various electrical equipment, insulating tapes used for joints and terminals of cables, materials used for heat-shrinkable tubes), and electric and electronic equipment materials used in a high-temperature atmosphere (e.g., lead wire materials for motors, wire materials around high-temperature furnaces). It can also be used for sealing layers and protective films (back sheets) of solar cells.

In the fuel cell field, the crosslinked rubber molded article can be used as any of seal materials between electrodes or between electrode and separator in solid polymer type fuel cells, phosphate type fuel cells, etc., and seals, packings and separators of pipes for hydrogen, oxygen, produced water, etc.

In the electronic component field, the crosslinked rubber molded article can be used as any of raw materials of heat dissipation materials, raw materials of electromagnetic wave shielding materials, gaskets for computer hard disc drives (magnetic recording devices), etc. Moreover, it can also be used as any of cushion rubbers (crash stoppers) for hard disk drives, binders for electrode active materials of nickel metal hydride secondary batteries, binders for active materials of lithium ion batteries, polymer electrolytes of lithium secondary batteries, binders for positive electrodes of alkaline storage batteries, EL element (electroluminescence element) binders, binders for electrode active materials of capacitors, sealants, sealing agents, covering materials for quartz of optical fibers, films and sheets such as optical fiber covering materials, electronic components, potting and coating and adhesive seals for circuit boards, fixing agents for electronic components, epoxy and other sealant modifiers, coating agents for printed circuit boards, modifiers of printed wiring board prepreg resins such as epoxy, anti-scattering materials for light bulbs and the like, gaskets for computers, large computer cooling hoses, packings such as gaskets and O-rings for secondary batteries, particularly lithium secondary batteries, sealing layer that covers one or both surfaces of outer surface of organic EL structure, connectors, dampers, etc.

In the chemical agent transportation equipment field, the crosslinked rubber molded article can be used as a safety valve or a shipping valve for truck, trailer, tank truck, ship, etc.

In the field of equipment components for exploration and mining of energy resources such as petroleum and gas, the crosslinked rubber molded article can be used as any of various seal materials used in the mining of oil, natural gas and the like, boots for electrical connectors used in oil wells, etc.

Examples of specific use forms in the field of equipment components for exploration and mining of energy resources include drill bit seals, pressure adjustment diaphragms, horizontal drilling motor (stator) seals, stator bearing (shaft) seals, seal materials used for blowout prevention devices (BOP), seal materials used for rotation blowout prevention devices (pipe wipers), seal materials and gas-liquid connectors used for MWD (real-time drilling information detection system), logging tool seals (e.g., O-rings, seals, packings, gas-liquid connectors, boots) used in logging devices (logging equipment), inflatable packers and completion packers and packer seals used in them, seals and packings used in cementing devices, seals used in perforators (perforation devices), seals and packings and motor linings used in mud pumps, underground detector covers, U-cups, composition seating cups, rotating seals, laminated elastomeric bearings, flow control seals, sand control seals, seals of safety valves, seals for hydraulic fracturing equipment (fracturing equipment), seals and packings for linear packers and linear hangers, seals and packings for wellheads, seals and packings for chokes and valves, seal materials for LWD (logging while drilling), diaphragms used in oil exploration and oil drilling applications (e.g., diaphragms for supplying lubricating oil, such as oil drilling pit), gate valves, electronic boots, and seal elements of perforation guns.

In addition, the crosslinked rubber molded article can also be used for joint seals for kitchen, bathroom, washroom, etc.; coated cloth of outdoor tent; seals for stamping; rubber hoses for gas heat pumps, chlorofluorocarbon-resistant rubber hoses; agricultural films, linings and weatherproof covers; tanks of laminated steel plates or the like used in the building or household appliance field, etc.

Moreover, it can be used as an article combined with a metal such as aluminum. Examples of such use forms include door seals, gate valves, pendulum valves, solenoid tips, piston seals and diaphragms combined with metals, and metal rubber parts combined with metals, such as metal gaskets.

Furthermore, it can also be used for rubber parts, brake shoes, brake pads, etc. of bicycles.

One form of the molded article of the present disclosure is a belt.

Examples of the belts are given below. Power transmission belts (including flat belts, V-belts, V-ribbed belts, toothed belts, etc.), flat belts used as conveying belts (conveyor belts) in various parts of high temperatures, such as parts around engine of agricultural machinery, machine tools, industrial machinery, etc.; conveyor belts for transporting bulk or granular materials such as coal, crushed stone, earth and sand, ore, and wood chips in a high-temperature environment; conveyor belts used in steelworks such as blast furnaces; conveyor belts in applications exposed to high temperatures in precision equipment assembly factories, food factories, etc.; V-belts and V-ribbed belts for agricultural machinery, general equipment (e.g., OA equipment, printing machines, commercial dryers), automobiles, etc.; transmission belts for transfer robots; toothed belts such as transmission belts for food machines and machine tools; and toothed belts used in automobiles, OA equipment, medical devices, printing machines, etc.

In particular, a timing belt is a typical toothed belt for automobiles.

The belt may have a single layer structure or a multilayer structure.

When the belt has a multilayer structure, the belt may be composed of a layer obtained by crosslinking the crosslinkable composition of the present disclosure and a layer made of another material.

Examples of the layer made of another material in the belt of the multilayer structure include a layer made of another rubber, a layer made of a thermoplastic resin, various fiber reinforced layers, a canvas, and a metal foil layer.

The molded article of the present disclosure can also be used for industrial anti-vibration pads, anti-vibration mats, railway slab mats, pads, rubber vibration insulators for automobiles, etc. Examples of the rubber vibration insulators for automobiles include rubber vibration insulators for engine mount, motor mount, member mount, strut mount, bush, damper, muffler hanger, and center bearing.

Examples of other use forms include joint members such as flexible joints and expansion joints, boots, and grommets. In the ship field, for example, marine pumps are mentioned.

The joint member is a joint used for piping and piping facilities, and it is used for applications such as prevention of vibration and noise generated from the piping system, absorption of expansion/contraction and displacement due to temperature change or pressure change, absorption of dimensional fluctuations, and mitigation and prevention of the impact due to earthquakes and ground subsidence.

The flexible joints and the expansion joints can be preferably used as complex-shaped molded bodies for, for example, shipbuilding piping, mechanical piping for pumps, compressors, etc., chemical plant piping, electrical piping, civil engineering/water piping, and automobiles.

The boots can be preferably used as complex-shaped molded bodies, e.g., boots for automobiles, such as constant velocity joint boots, dust covers, rack and pinion steering boots, pin boots and piston boots, boots for agricultural machinery, boots for industrial vehicles, boots for building machinery, boots for hydraulic machinery, boots for pneumatic machinery, boots for centralized lubricators, boots for transfer of liquids, boots for firefighting, and various industrial boots such as boots for transfer of various liquefied gases.

The molded article of the present disclosure can also be used for diaphragms for filter presses, diaphragms for blowers, diaphragms for water supply, diaphragms for liquid storage tanks, diaphragms for pressure switches, diaphragms for accumulators, diaphragms for air springs such as suspension, etc.

By adding the molded article of the present disclosure to a rubber or a resin, an anti-slip agent for obtaining a molded article and a coating film which are not slippery in an environment where the article and the film get wet with water such as rain, snow, ice or sweat is obtained.

The molded article of the present disclosure can also be used as a cushion material for hot press molding in the production of decorative plywood, printed circuit boards, electrical insulation plates, rigid polyvinyl chloride laminates, etc. using melamine resin, phenolic resin, epoxy resin or the like.

The molded article of the present disclosure can also contribute to impermeability of various supports such as weapon-related sealing gaskets and protective clothing against contact with invasive chemical agents.

Moreover, it can be used as any of O (square)-rings, V-rings, X-rings, packings, gaskets, diaphragms, oil seals, bearing seals, lip seals, plunger seals, door seals, lip and face seals, gas delivery plate seals, wafer support seals, barrel seals and other various seals, which are used for sealing lubricating oils (engine oil, transmission oil, gear oil, etc.) containing amine type additives (particularly, amine type additive used as antioxidant or detergent dispersant) used for transportation systems such as automobiles and ships, and fuel oils and greases (particularly, urea-based grease), and it can also be used as any of tubes, hoses, various rubber rolls, coatings, belts, valve bodies of valves, etc. Furthermore, it can also be used as a laminating material or a lining material.

It is possible to also use it for covering materials for heat-resistant oil-resistant wires used as lead wires of sensors that come into contact with transmission oil and/or engine oil of internal combustion engines of automobiles, etc. and detect the oil temperature and/or the oil pressure, or in a high-temperature oil atmosphere such as an oil pan of automatic transmission or engine.

The molded article of present disclosure is sometimes used by forming a vulcanized film thereon. Specific examples of such applications include non-sticky oil-resistant rolls for copying machines, weatherstrips for weather proofing and freeze proofing, infusion rubber stoppers, vial rubber stoppers, mold release agents, non-sticky light conveying belts, anti-adhesion coating films on play gaskets of automobile engine mounts, synthetic fiber coating, and bolt members or joints having a thin packing coating layer.

The uses of the molded article of the present disclosure for automobile-related parts include uses for parts of motorcycles having the same structure.

Examples of automobile-related fuels include light oil, gasoline, and diesel engine fuel (including biodiesel fuel).

The crosslinkable composition of the preset disclosure is crosslinked and used as a molded article, and besides, it can also be used for various parts in various industrial fields. Then, next, use applications of the crosslinkable composition of the present disclosure will be described.

The crosslinkable composition of the present disclosure can be used for surface modifiers for metals, rubbers, plastics, glasses, etc.; seal materials and covering materials requiring heat resistance, chemical resistance, oil resistance and non-stickiness, such as metal gaskets and oil seals; non-sticky covering materials such as rolls for OA equipment and belts for OA equipment, or bleed barriers; and coating woven fabric sheets and belts by impregnation or baking.

The crosslinkable composition of the present disclosure can be used as a seal material, a lining or a sealant having a more complex shape than usual use by allowing it to have high viscosity and high concentration, and it can be used for forming a thin film of several microns by allowing it to have low viscosity, and it can be used for coating pre-coated metals, O-rings, diaphragms and reed valves by allowing it to have medium viscosity.

Moreover, the composition can also be used for coating conveying rolls or belts for woven fabrics or paper sheets, printing belts, chemical-resistant tubes, medicine plugs, fuel hoses, etc.

The article base materials to be coated with the crosslinkable composition of the present disclosure may be metals such as iron, stainless steel, copper, aluminum and brass; glass products such as glass plates, and glass fiber woven fabrics and nonwoven fabrics; molded articles and coated materials of general-purpose and heat-resistant resins such as polypropylene, polyoxymethylene, polyimide, polyamideimide, polysulfone, polyethersulfone and polyether ether ketone; molded articles and coated materials of general-purpose rubbers such as SBR, butyl rubber, NBR and EPDM, and heat-resistant rubbers such as silicone rubber and fluoroelastomer; and woven fabrics and nonwoven fabrics of natural fibers and synthetic fibers.

The coated materials formed from the crosslinkable composition of the present disclosure can be used in fields where heat resistance, solvent resistance, lubricity and non-stickiness are required, and examples of specific use applications include rolls (e.g., fixing roll, pressing roll) and conveying belts for OA equipment such as copying machine, printer and facsimile; sheets and belts; O-rings, diaphragms, chemical-resistant tubes, fuel hoses, valve seals, gaskets for chemical plant, and engine gaskets.

Moreover, the crosslinkable composition of the present disclosure can be used as a coating material or an adhesive by being dissolved in a solvent. Furthermore, it can also be used as a coating material in the form of an emulsified dispersion (latex).

The composition is used as a seal material or a lining for various devices and pipes, a surface-treating agent for structures composed of inorganic and organic base materials such as metals, ceramics, glasses, stones, concrete, plastics, rubbers, wood, papers and fibers, or the like.

The composition can be applied to base materials, etc. by dispenser system coating or screen-printing coating.

The crosslinkable composition of the present disclosure may be used as a coating composition for film casting or for dipping base materials such as fabrics, plastics, metals or elastomers.

In particular, the crosslinkable composition of the present disclosure may be used, in the form of a latex, for coated fabrics, protective gloves, impregnated fibers, O-ring coating, coating for fuel system quick coupling O-rings, coating for fuel system seals, coating for fuel tank rollover valve diaphragms, coating for fuel tank pressure sensor diaphragms, coating for oil filter and fuel filter seals, coating for fuel tank sender seals and sender head fitting seals, coating for copying machine fixing mechanism rolls, and for producing a polymer coating composition.

They are useful for coating silicone rubber, nitrile rubber and other elastomers. For the purpose of enhancing both of permeation resistance and chemical resistance of a base material elastomer as well as its heat stability, they are also useful for coating parts produced from such an elastomer. Other use applications include coating for heat exchangers, expansion joints, bats, tanks, fans, flue ducts and other conduits, and storage structures such as concrete storage structures. The composition may be applied to an exposed cross section of a multilayer component structure in, for example, a method for producing hose structures and diaphragms. Sealing members at connecting parts and joints are often made of rigid materials, and the crosslinkable composition of the present disclosure provides an increased dimensional interference fit with reduced trace leakage along the improved frictional interface and the sealing surface. The latex enhances seal durability in various automobile system applications.

They can also be used in the production of power steering system, fuel system, air conditioning system, and any joints where hoses and tubes are connected to other components. A further usefulness of the composition is in repairing of manufacturing defects (and damage attributed to use) in multilayer rubber structures such as a three-layer fuel hose. The composition is also useful for coating thin steel sheets that can be formed or embossed before or after application of a coating material. For example, a large number of layers of coated steel can be assembled to form a gasket between two rigid metal members. The sealing effect is obtained by applying the crosslinkable composition of the present disclosure between the layers. This process can be used for producing engine head gaskets and exhaust manifold gaskets for the purpose of reducing bolt force and strain of the assembled components and providing good saving in fuel and low emission due to low crack, deflection and hole strain.

In addition, the crosslinkable composition of the present disclosure can also be used as any of coating agents; base material-integrated gaskets and packings obtained by performing dispenser molding on base materials containing an inorganic material such as metal or ceramic; multilayer products obtained by coating base materials containing an inorganic material such as metal or ceramic, etc.

The embodiments are described hereinbefore, and it will be understood that various modifications of forms and details can be made without departing from the spirit and the scope of the claims.

EXAMPLES

Next, the embodiments of the present disclosure will be described with reference to examples, but the present disclosure is not limited to the examples only.

Numerical values of the examples are measured by the following methods.

[Copolymer Compositional Features]

The copolymer compositional features were measured by a NMR method.
Measuring device: VNMR S400 manufactured by Varian, Inc.
Resonance frequency: 376.04 (Sfrq)
Pulse width: 30° (pw=6.8)

[Glass Transition Temperature (Tg)]

Using a differential scanning calorimeter (manufactured by Mettler Toledo, DSC822e, or manufactured by Hitachi Techno Science Co., X-DSC823e), 10 mg of a sample was heated at 20° C./min to obtain a DSC curve, and a temperature indicating an intersection point of an extension of a baseline around the second-order transition of the DSC curve with a tangent of the DSC curve at the inflection point was taken as the glass transition temperature.

[Heat of Fusion]

Using a differential scanning calorimeter (manufactured by Mettler Toledo, DSC822e, or manufactured by Hitachi Techno Science Co., X-DSC823e), 10 mg of a sample was heated at 20° C./min to obtain a DSC curve, and from a magnitude of a melting peak (ΔH) appearing in the DSC curve, a heat of fusion was calculated.

[Number-Average Molecular Weight (Mn), Weight-Average Molecular Weight (Mw)]

Based on the results measured by a GPC method, a molecular weight was calculated using standard polystyrene as a standard.
GPC equipment: TOSOH HLC-8020
Column: Shodex GPC806M: two, GPC801, 802: one for each
Developing solvent: tetrahydrofuran [THF]
Sample concentration: 0.1 mass %
Measuring temperature: 40° C.

[Iodine Content Measurement]

The amount 5 mg of $Na_2SO3$ was mixed with 12 mg of a sample (fluorine-containing elastomer), a solution prepared by dissolving 30 mg of $Na_2CO_3$ and $K_2CO_3$ mixed in a ratio of 1:1 (ratio by weight) in 20 ml of pure water was used as an absorption liquid, the mixture was burned in an oxygen atmosphere in a quarts flask, and the resultant absorption liquid was allowed to stand for 30 minutes, and thereafter, the iodine content was measured using a Shimadzu 20A ion chromatograph. A calibration curve was measured using a KI standard solution containing 0.5 ppm of iodine ion and a KI standard solution containing 1.0 ppm of iodine ion.

[Mooney Viscosity]

The Mooney viscosity was measured in accordance with ASTM-D1646 and JIS K6300.
Measuring equipment: MV2000E model manufactured by Alpha Technologies Inc.
Rotor rotational speed: 2 rpm
Measuring temperature: 100° C. or 121° C.

[Evaluation of Resistance to Bases]

In acetone, 0.1 g of an elastomer was dissolved, thereby preparing 10 g of an acetone solution. To this solution, several drops of a phenolphthalein solution were added, then an ethanolic potassium hydroxide solution of 0.1 mol/L was dropwise added, and taking the point in time, at which the solution did not return to colorless and transparent from pink, as the end point, the amount of the solution dropwise added was measured. Regarding the elastomer obtained in each of the examples and the comparative examples, the amount dropwise added was determined, and relative comparison was carried out with the proviso that the amount dropwise added in Comparative Example 2 was 1. As the amount dropwise added is smaller, the resistance to bases is more excellent. The results are shown in the FIGURE.

[Crosslinking Characteristics]

Using a rheometer (manufactured by M&K Co., Ltd., MDRH2030), a crosslink curve of a crosslinkable composition was determined under the conditions of 160° C. and 100 minutes or 10 minutes, and by the changes of torque, minimum viscosity (ML), maximum viscosity (MH), induction time (T10) and optimum crosslinking time (T90) were determined.

[100% Modulus (M100)]

100% Modulus (M100) of a sheet after secondary crosslinking obtained in each of the examples and the comparative examples was measured in accordance with JIS-K6251.

[Tensile Breaking Strength (Tb) and Tensile Breaking Elongation (Eb)]

Tensile breaking strength (Tb) and tensile breaking elongation (Eb) of a sheet after secondary crosslinking obtained in each of the examples and the comparative examples were measured in accordance with JIS-K6251.

[Hardness]

Hardness (PEAK value) of a sheet after secondary crosslinking obtained in each of the examples and the comparative examples was measured in accordance with JIS-K6253.

[Compression Set]

Compression set of an O-ring of P-24 size defined by JIS-B2401 was measured in accordance with JIS-K6262. Specifically, an O-ring after secondary crosslinking obtained in each of the examples and the comparative examples was held at 200° C. for 70 hours under 25% compression by pressure application, then released, and allowed to stand for 30 minutes in a constant temperature room at 25° C., and thereafter, the thickness of the O-ring was measured, thereby determining compression set.

Example 1

In a 100 ml stainless steel (SUS) autoclave, 40 g of dichloropentafluoropropane (R-225) was introduced and cooled to dry ice temperature, then 0.46 g of a perfluorohexane solution containing 8 mass % of di(2,2,3,3,4,4,5,5,6,6,7,7-dodecafluoroheptanoyl)peroxide and 9.8 g of AEHF-1 were added, this was cooled to dry ice temperature, then the autoclave was purged with nitrogen, thereafter 4.5 g of vinylidene fluoride (VdF) was added, and the mixture was shaken at 25° C. for 8.0 hours using a shaker. The resulting colorless and transparent solution was dried, thereby obtaining 2.3 g of a colorless and transparent elastomer.

In the resulting elastomer, AEHF-1 and VdF were contained in a molar ratio of 67.5/22.5. Tg of the resulting elastomer was determined to be −28.7° C. by DSC. A melting peak was not confirmed. Mn was 53,800, Mw was 107,000, and Mw/Mn was 2.0. Moreover, resistance to bases was evaluated by the aforesaid method. The result is shown in the FIGURE.

AEHF-1

AEHF-1 is perfluoro (2,9,9-trihaloid-5-trifluoromethyl-3,6-dioxa-8-heptene), and is represented by the following chemical formula.

$$CH_2\!\!=\!\!CFCF_2\!-\!O\!-\!\underset{CF_3}{CFCF_2}\!-\!O\!-\!\underset{CF_3}{CHF}$$

Example 2

In a 100 ml stainless steel (SUS) autoclave, 40 g of dichloropentafluoropropane (R-225) was introduced and cooled to dry ice temperature, then 0.43 g of a perfluorohexane solution containing 8 mass % of di(2,2,3,3,4,4,5,5,6,6,7,7-dodecafluoroheptanoyl)peroxide and 1.6 g of AEHF-1 were added, this was cooled to dry ice temperature, then the autoclave was purged with nitrogen, thereafter 6.3 g of vinylidene fluoride (VdF) was added, and the mixture was shaken at 25° C. for 1.3 hours using a shaker. The resulting colorless and transparent solution was dried, thereby obtaining 0.91 g of a colorless and transparent elastomer.

In the resulting elastomer, AEHF-1 and VdF were contained in a molar ratio of 32.5/67.5. Tg of the resulting elastomer was determined to be −28.7° C. by DSC. A melting peak was not confirmed. Mn was 33,600, Mw was 54,200, and Mw/Mn was 1.6. Moreover, resistance to bases was evaluated by the aforesaid method. The result is shown in the FIGURE.

Example 3

In a 100 ml stainless steel (SUS) autoclave, 40 g of dichloropentafluoropropane (R-225) was introduced and cooled to dry ice temperature, then 0.43 g of a perfluorohexane solution containing 8 mass % of di(2,2,3,3,4,4,5,5,6,6,7,7-dodecafluoroheptanoyl)peroxide and 5.9 g of AEHF-1 were added, this was cooled to dry ice temperature, then the autoclave was purged with nitrogen, thereafter 7.5 g of vinylidene fluoride (VdF) was added, and the mixture was shaken at 25° C. for 1.3 hours using a shaker. The resulting colorless and transparent solution was dried, thereby obtaining 1.69 g of a colorless and transparent elastomer.

In the resulting elastomer, AEHF-1 and VdF were contained in a molar ratio of 49.0/51.0. Tg of the resulting elastomer was determined to be −26.8° C. by DSC. A melting peak was not confirmed. Mn was 52,800, Mw was 94,900, and Mw/Mn was 1.8. Moreover, resistance to bases was evaluated by the aforesaid method. The result is shown in the FIGURE.

Example 4

In a 100 ml stainless steel (SUS) autoclave, 40 g of dichloropentafluoropropane (R-225) was introduced and cooled to dry ice temperature, then 0.43 g of a perfluorohexane solution containing 8 mass % of di(2,2,3,3,4,4,5,5,6,6,7,7-dodecafluoroheptanoyl)peroxide and 0.7 g of AEHF-1 were added, this was cooled to dry ice temperature, then the autoclave was purged with nitrogen, thereafter 6.6 g of vinylidene fluoride (VdF) was added, and the mixture was shaken at 25° C. for 0.7 hour using a shaker. The resulting colorless and transparent solution was dried, thereby obtaining 0.32 g of a colorless and transparent elastomer.

In the resulting elastomer, AEHF-1 and VdF were contained in a molar ratio of 21.0/79.0. Tg of the resulting elastomer was determined to be −32.7° C. by DSC. A melting peak was not confirmed. Mn was 27,100, Mw was 49,900, and Mw/Mn was 1.8. Moreover, resistance to bases was evaluated by the aforesaid method. The result is shown in the FIGURE.

Example 5

In a 100 ml stainless steel (SUS) autoclave, 40 g of dichloropentafluoropropane (R-225) was introduced and cooled to dry ice temperature, then 0.43 g of a perfluorohexane solution containing 8 mass % of di(2,2,3,3,4,4,5,5,6,6,7,7-dodecafluoroheptanoyl)peroxide and 0.3 g of AEHF-1 were added, this was cooled to dry ice temperature, then the autoclave was purged with nitrogen, thereafter 6.6 g of vinylidene fluoride (VdF) was added, and the mixture was shaken at 25° C. for 0.9 hour using a shaker. The resulting cloudy solution was dried, thereby obtaining 0.42 g of a cloudy elastomer.

In the resulting elastomer, AEHF-1 and VdF were contained in a molar ratio of 7.0/93.0. Tg of the resulting elastomer was determined to be −31.7° C. by DSC. A melting peak was not confirmed. Mn was 32,200, Mw was 55,000, and Mw/Mn was 1.7. Moreover, resistance to bases was evaluated by the aforesaid method. The result is shown in the FIGURE.

Example 6

In a 100 ml stainless steel (SUS) autoclave, 40 g of dichloropentafluoropropane (R-225) was introduced and cooled to dry ice temperature, then 0.43 g of a perfluorohexane solution containing 8 mass % of di(2,2,3,3,4,4,5,5,6,6,7,7-dodecafluoroheptanoyl)peroxide and 0.8 g of a VE compound were added, this was cooled to dry ice temperature, then the autoclave was purged with nitrogen, thereafter 6.6 g of VdF was added, and the mixture was shaken at 25° C. for 0.6 hour using a shaker. The resulting colorless and transparent solution was dried, thereby obtaining 0.70 g of a colorless and transparent elastomer.

In the resulting elastomer, the VE compound and VdF were contained in a molar ratio of 20.5/79.5. Tg of the resulting elastomer was determined to be −26.3° C. by DSC. A melting peak was not confirmed. Mn was 23,100, Mw was 41,580, and Mw/Mn was 1.8. Moreover, resistance to bases was evaluated by the aforesaid method. The result is shown in the FIGURE.

VE Compound

The VE compound is 1-fluoro-1-(pentafluoroethoxy)ethylene, and is represented by the following chemical formula.

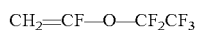

Example 7

In a 6 L stainless steel autoclave, 2,400 ml of pure water and 600 g of a 50 mass % aqueous solution of $C_5F_{11}COONH_4$ were added, then the autoclave was purged with nitrogen and slightly pressurized with VdF, the temperature was controlled to 80° C. while stirring at 600 rpm, then 25 g of AEHF-1 was injected, and VdF was injected up to 2.01 MPa. Into this, a solution obtained by dissolving 0.09 g of ammonium persulfate in 5 ml of pure water was injected with nitrogen. When the pressure dropped down to 1.98 MPa, 5 g of VdF and 6.363 g of AEHF-1 were added. This operation was repeated, and after about 20 minutes, 5 g of VdF was introduced, and at that time, 0.609 g of 1,4-diiodoperfluorobutane and 2 g of water for pushing were injected with nitrogen. After 130 minutes, further, 135 g of VdF and 165.438 g of AEHF-1 were introduced, and at that time, the gas in the autoclave was released, then the autoclave was cooled, and 3,317 g of a dispersion was recovered.

The solid content in the dispersion was 10.77 mass % (amount of polymer: 357 g). To this dispersion was added aluminum sulfate to coagulate the dispersion, followed by drying, whereby 350.2 g of an elastomer was obtained. In the resulting elastomer, VdF and AEHF-1 were contained in a molar ratio of 81.4/18.6. Tg of the resulting elastomer was determined to be −27.2° C. by DSC. A melting peak was not confirmed. The Mooney viscosity at 121° C. was 15, and the iodine content was 0.13 mass %.

Next, using an 8-inch twin roll, 100 parts by mass of the elastomer, 20 parts by mass of carbon black (manufactured by Cancarb Limited, Thermax N990), 4 parts by mass of triallyl isocyanurate (manufactured by Nihon Kasei Co., Ltd., TAIC) and 1.5 parts by mass of a peroxide (manufactured by NOF CORPORATION, PERHEXA 25B) were kneaded at 20 to 70° C. to prepare a crosslinkable composition.

Using a mold capable of preparing a sheet having a thickness of 2 mm and an O-ring of P-24 size, the resulting crosslinkable composition was molded, then subjected to primary crosslinking under the conditions of 160° C. and 10 minutes, thereafter taken out of the mold, and subjected to secondary crosslinking in an oven under the conditions of 180° C. and 4 hours, thereby preparing crosslinked rubber molded articles (sheet having thickness of 2 mm and O-ring of P-24 size). Evaluation results of the crosslinkable composition and the crosslinked rubber molded articles are set forth in Table 1.

Comparative Example 1

Using a fluorine-containing elastomer shown below, evaluation was carried out in the same manner as in Example 1. The result is shown in the FIGURE.
Molar ratio of 2,3,3,3-tetrafluoropropene unit to VdF unit (2,3,3,3-tetrafluoropropene/VdF): 22.5/77.5
Mooney viscosity (ML1+10 (121° C.)): 23
Glass transition temperature (Tg): −13.2° C.
Heat of fusion: not observed in second run
Iodine content: 0.17 mass %

A crosslinkable composition was prepared and crosslinked rubber molded articles were prepared in the same manner as in Example 7, except that the fluorine-containing elastomer shown above was used. Evaluation results of the crosslinkable composition and the crosslinked rubber molded articles are set forth in Table 1.

Comparative Example 2

Using a fluorine-containing elastomer shown below, evaluation was carried out in the same manner as in Example 1. The result is shown in the FIGURE.
Molar ratio of HFP unit to VdF unit (HFP/VdF): 21.8/78.2
Mooney viscosity (ML1+10 (100° C.)): 69
Glass transition temperature (Tg): −20.2° C.
Heat of fusion: not observed in second run
Iodine content: 0.18 mass %

TABLE 1

|  |  | Ex. 7 | Comp. Ex. 1 |
|---|---|---|---|
| Blending for crosslinkable composition | | | |
| Fluorine-containing elastomer | Parts by mass | 100 | 100 |
| Carbon black | Parts by mass | 20 | 20 |
| Triallyl isocyanurate | Parts by mass | 4 | 4 |
| Peroxide | Parts by mass | 1.5 | 1.5 |
| Crosslinking characteristics | | | |
| Temperature | ° C. | 160 | 160 |
| Time | min | 100 | 10 |
| ML | dNm | 0.3 | 0.3 |
| MH | dNm | 5.3 | 11.1 |

TABLE 1-continued

|  |  | Ex. 7 | Comp. Ex. 1 |
|---|---|---|---|
| T10 | min | 0.8 | 0.9 |
| T90 | min | 3.2 | 4.3 |
| Physical properties of crosslinked rubber molded article | | | |
| M100 | MPa | 3.1 | 2.0 |
| Tb | MPa | 10.5 | 21.4 |
| Eb | % | 390 | 480 |
| | Hardness (PEAK) | 74 | 67 |
| Compression set | % | 38 | 27 |

The invention claimed is:

1. A crosslinkable composition consisting of
a fluorine-containing elastomer,
a cross-linking agent, and
optionally at least one selected from the group consisting of a crosslinking aid, a crosslinking accelerator, a filler, a plasticizer, a processing aid, an acid acceptor, a mold release agent, a pigment, a flame retarder, a lubricant, a light stabilizer, a weathering stabilizer, an antistatic agent, an ultraviolet absorbing agent, an antioxidant, a foaming agent, a perfume, an oil, a softener, a solvent and a polymer different from the fluorine-containing elastomer,
wherein the fluorine-containing elastomer consists of:
a vinylidene fluoride unit,
at least one unsaturated ether unit selected from the group consisting of a unit based on a monomer (1) represented by the general formula (1) and a unit based on a monomer (2) represented by the general formula (2), and
optionally at least one selected from the group consisting of tetrafluoroethylene unit, hexafluoropropylene unit, perfluoro(methyl vinyl ether) unit, perfluoro(ethyl vinyl ether) unit, perfluoro(propyl vinyl ether) unit, chlorotrifluoroethylene unit, trifluoroethylene unit, hexafluoroisobutene unit, vinyl fluoride unit, ethylene unit, propylene unit, alkyl vinyl ether unit, a unit based on a fluorine-containing monomer represented by the general formula (11), a unit based on an iodine- or bromine-containing monomer represented by the general formula (12), a unit based on an iodine- or bromine-containing monomer represented by the general formula (13), a unit based on a monomer represented by the general formula (14), a unit based on a monomer represented by the general formula (15) and a unit based on a monomer represented by the general formula (16),
the polymer different from the fluorine-containing elastomer consists of at least one selected from the group consisting of a nitrile rubber, an acrylic rubber, an epichlorohydrin rubber, a fluorosilicone rubber, a silicone rubber and a fluorine-containing thermoplastic elastomer,
a molar ratio of the vinylidene fluoride unit to the unsaturated ether unit (vinylidene fluoride unit/unsaturated ether unit) is 95/5 to 20/80,
a glass transition temperature of the fluorine-containing elastomer is 20° C. or lower, and
the cross-linking agent is an organic peroxide, $$CH_2=CFCF_2—O—Rf^1 \quad \text{the general formula (1):}$$

wherein $Rf^1$ is a partially fluorinated alkyl group where a part of hydrogen atoms bonded to a carbon atom is substituted by a fluorine atom or a perfluorinated alkyl group where all hydrogen atoms bonded to a carbon atom are substituted by fluorine atoms, and the partially fluorinated alkyl group and the perfluorinated alkyl group are linear or branched chain, have 1 to 20 carbon atoms, and optionally contain an oxygen atom between carbon-carbon atoms when the partially fluorinated alkyl group or the perfluorinated alkyl group has 2 or more carbon atoms;

$$CH_2=CF—O—Rf^2 \quad \text{the general formula (2):}$$

wherein $Rf^2$ is a fluorinated alkyl group containing no substituent other than a fluorine atom;

$$CHX^{11}—CX^{12}Rf \quad \text{the general formula (11):}$$

wherein one of $X^{11}$ and $X^{12}$ is H, the other is F, and Rf is a linear or branched fluoroalkyl group having 1 to 12 carbon atoms;

$$CX^{13}_2=CX^{13}—Rf^{11}CHR^{11}X^{14} \quad \text{the general formula (12):}$$

wherein each $X^{13}$ is the same or different and is H, F or $—CH_3$, $Rf^{11}$ is a fluoroalkylene group, a perfluoroalkylene group, a fluoro(poly)oxyalkylene group or a perfluoro(poly)oxyalkylene group, $R^{11}$ is H or $—CH_3$, and $X^{14}$ is I or Br;

$$CX^{15}_2=CX^{15}—Rf^{12}X^{16} \quad \text{the general formula (13):}$$

wherein each $X^{15}$ is the same or different and is H, F or $—CH_3$, $Rf^{12}$ is a fluoroalkylene group, a perfluoroalkylene group, a fluoro(poly)oxyalkylene group or a perfluoro(poly)oxyalkylene group, and $X^{16}$ is I or Br;

$$CF_2=CFO(CF_2CF(CF_3)O)_m(CF_2)_n—X^{17} \quad \text{the general formula (14):}$$

wherein m is an integer of 0 to 5, n is an integer of 1 to 3, and $X^{17}$ is a cyano group, a carboxyl group, an alkoxycarbonyl group, I or Br;

$$CH_2=CFCF_2O(CF(CF_3)CF_2O)_m(CF(CF_3))_n—X^{18} \quad \text{the general formula (15):}$$

wherein m is an integer of 0 to 5, n is an integer of 1 to 3, and $X^{18}$ is a cyano group, a carboxyl group, an alkoxycarbonyl group, I, Br or $—CH_2OH$; and $$CR^{12}R^{13}=CR^{14}—Z—CR^{15}=CR^{16}R^{17} \quad \text{the general formula (16):}$$

wherein $R^{12}$ to $R^{17}$ are the same or different and are each H or an alkyl group having 1 to 5 carbon atoms; and
Z is an alkylene group having 1 to 18 carbon atoms and being linear or branched chain and optionally having an oxygen atom, a cycloalkylene group having 3 to 18 carbon atoms and being linear or branched chain and optionally having an oxygen atom, at least partially fluorinated alkylene or oxyalkylene group having 1 to 10 carbon atoms and being linear or branched chain and optionally having an oxygen atom, or a (per)fluoropolyoxyalkylene group represented by $$-(Q)_p-CF_2O—(CF_2CF_2O)_m(CF_2O)_n—CF_2-(Q)_p-$$

wherein Q is an alkylene or oxyalkylene group, p is 0 or 1, m is 0.2 to 5, and n is 0.2 to 5, and having a molecular weight of 500 to 10,000.

2. The crosslinkable composition according to claim 1, wherein the at least one unsaturated ether unit is the unit based on the monomer (1).

3. The crosslinkable composition according to claim 1, wherein $Rf^1$ is a partially fluorinated alkyl group where a part of hydrogen atoms bonded to a carbon atom is substituted by a fluorine atom or a perfluorinated alkyl group where all hydrogen atoms bonded to a carbon atom are substituted by fluorine atoms, and the partially fluorinated alkyl group and the perfluorinated alkyl group are linear or branched chain and have 1 to 14 carbon atoms, or a partially fluorinated alkyl group where a part of hydrogen atoms bonded to a carbon atom is substituted by a fluorine atom or a perfluorinated alkyl group where all hydrogen atoms bonded to a carbon atom are substituted by fluorine atoms, and the partially fluorinated alkyl group and the perfluorinated alkyl group are linear or branched chain, have 2 to 20 carbon atoms, and contain an oxygen atom between carbon-carbon atoms.

4. The crosslinkable composition according to claim 1, wherein $Rf^1$ is a group represented by the general formula (3):

wherein $Rf^3$ is a partially fluorinated alkyl group where a part of hydrogen atoms bonded to a carbon atom is substituted by a fluorine atom or a perfluorinated alkyl group where all hydrogen atoms bonded to a carbon atom are substituted by fluorine atoms, and the partially fluorinated alkyl group and the perfluorinated alkyl group are linear or branched chain and have 1 to 4 carbon atoms, $Rf^4$ is a partially fluorinated alkyl group where a part of hydrogen atoms bonded to a carbon atom is substituted by a fluorine atom or a perfluorinated alkyl group where all hydrogen atoms bonded to a carbon atom are substituted by fluorine atoms, the partially fluorinated alkyl group and the perfluorinated alkyl group are linear or branched chain and have 1 to 4 carbon atoms, and n is an integer of 0 to 4.

5. The crosslinkable composition according to claim 4, wherein n in the general formula (3) is an integer of 1 to 4.

6. A molded article obtained from the crosslinkable composition according to claim 1.

* * * * *